(12) United States Patent
McQuade et al.

(10) Patent No.: US 11,341,853 B2
(45) Date of Patent: *May 24, 2022

(54) SYSTEM AND METHOD TO ENHANCE THE UTILITY OF VEHICLE INSPECTION RECORDS BY INCLUDING ROUTE IDENTIFICATION DATA IN EACH VEHICLE INSPECTION RECORD

(71) Applicant: ZONAR SYSTEMS, INC., Seattle, WA (US)

(72) Inventors: Charles Michael McQuade, Issaquah, WA (US); Brett Brinton, Seattle, WA (US)

(73) Assignee: Zonar Systems, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/136,663

(22) Filed: Sep. 20, 2018

(65) Prior Publication Data

US 2019/0019415 A1 Jan. 17, 2019

Related U.S. Application Data

(63) Continuation of application No. 14/630,371, filed on Feb. 24, 2015, now abandoned, which is a (Continued)

(51) Int. Cl.
*G07C 5/00* (2006.01)
*G08G 1/00* (2006.01)
(Continued)

(52) U.S. Cl.
CPC .............. *G08G 1/20* (2013.01); *G06Q 10/06* (2013.01); *G06Q 50/30* (2013.01); *G07C 5/008* (2013.01); *G07C 5/085* (2013.01); *G07C 2205/02* (2013.01)

(58) Field of Classification Search
CPC .......... G06Q 50/30; G06Q 10/06; G08G 1/20; G07C 5/008; G07C 2205/02; G07C 7/085;
(Continued)

(56) References Cited

U.S. PATENT DOCUMENTS 3,573,620 A 6/1971 Ashley et al.
3,990,067 A 2/1976 Van Dusen et al.
(Continued)

FOREIGN PATENT DOCUMENTS

CA 2138378 11/1994
CA 2388572 5/2001
(Continued)

OTHER PUBLICATIONS

Integrating brick and mortar locations with e-commerce: understanding synergy opportunities; C Steinfield, T Adelaar, Y Lai—Proceedings of the 35th Annual . . . , 2002—ieeexplore.ieee.org (Year: 2002).*

(Continued)

*Primary Examiner* — Cuong H Nguyen (57) ABSTRACT

A handheld, portable device is used to facilitate inspection of vehicles, by generating an electronic vehicle inspection record that can be used by fleet operators to provide evidence of complying with required vehicle inspections. When the vehicle inspection record is generated, route identification data is added to the inspection record. The route identification data defines which of a plurality of predefined routes the vehicle has serviced, or will service, during a time period proximate the inspection of the vehicle. Fleet operators can thus use archived inspection records as evidence of compliance with inspection requirements, and to document what route a vehicle serviced at a particular time.

13 Claims, 6 Drawing Sheets

Related U.S. Application Data continuation-in-part of application No. 13/159,182, filed on Jun. 13, 2011, now Pat. No. 8,972,097, which is a continuation-in-part of application No. 12/942,874, filed on Nov. 9, 2010, now abandoned, which is a continuation-in-part of application No. 12/724,232, filed on Mar. 15, 2010, now Pat. No. 8,972,179, which is a continuation-in-part of application No. 11/675,502, filed on Feb. 15, 2007, now Pat. No. 7,680,595, which is a continuation-in-part of application No. 11/425,222, filed on Jun. 20, 2006, now Pat. No. 7,564,375, which is a continuation-in-part of application No. 11/247,953, filed on Oct. 11, 2005, now Pat. No. 7,362,229, which is a continuation-in-part of application No. 10/915,957, filed on Aug. 11, 2004, now Pat. No. 7,557,696, which is a continuation-in-part of application No. 10/219,892, filed on Aug. 15, 2002, now Pat. No. 6,804,626, which is a continuation-in-part of application No. 09/951,104, filed on Sep. 11, 2001, now Pat. No. 6,671,646.

(51) Int. Cl.
*G06Q 50/30* (2012.01)
*G06Q 10/06* (2012.01)
*G07C 5/08* (2006.01)

(58) Field of Classification Search
CPC ..... G06F 7/00; G06F 19/00; G01R 31/31919; G01R 31/318536
USPC .......... 705/7.11 B; 455/556.1; 707/707–708, 707/772–774; 340/994, 988, 991; 438/17–18; 235/375–377
See application file for complete search history.

(56) References Cited

U.S. PATENT DOCUMENTS

| | | |
|---|---|---|
| 4,025,791 A | 4/1977 | Lennington et al. |
| 4,092,718 A | 5/1978 | Wendt |
| 4,258,421 A | 3/1981 | Juhasz et al. |
| 4,263,945 A | 4/1981 | Van Ness |
| 4,325,057 A | 4/1982 | Bishop |
| 4,469,149 A | 4/1984 | Walkey et al. |
| 4,602,127 A | 7/1986 | Neely et al. |
| 4,651,157 A | 3/1987 | Gray et al. |
| 4,658,371 A | 4/1987 | Walsh et al. |
| 4,763,356 A | 9/1988 | Day, Jr. et al. |
| 4,799,162 A | 1/1989 | Shinakawa et al. |
| 4,804,937 A | 2/1989 | Barbiaux et al. |
| 4,814,711 A | 3/1989 | Olsen et al. |
| 4,846,233 A | 11/1989 | Fockens |
| 4,897,792 A | 1/1990 | Hosoi |
| 4,934,419 A | 6/1990 | Lamont et al. |
| 4,935,195 A | 6/1990 | Palusamy et al. |
| 5,058,044 A | 10/1991 | Stewart et al. |
| 5,072,380 A | 10/1991 | Randelman et al. |
| 5,068,656 A | 11/1991 | Sutherland |
| 5,128,651 A | 7/1992 | Heckart |
| 5,120,942 A | 9/1992 | Holland |
| 5,204,819 A | 4/1993 | Ryan |
| 5,206,643 A | 4/1993 | Eckelt |
| 5,223,844 A | 6/1993 | Mansell et al. |
| 5,243,323 A | 7/1993 | Rogers |
| 5,321,629 A | 6/1994 | Shirata et al. |
| 5,337,003 A | 9/1994 | Carmichael et al. |
| 5,359,522 A | 10/1994 | Ryan |
| 5,394,136 A | 2/1995 | Lammers et al. |
| 5,399,844 A | 3/1995 | Holland |
| 5,442,553 A | 8/1995 | Parrillo |
| 5,459,304 A | 10/1995 | Eisenmann |
| 5,459,660 A | 10/1995 | Berra |
| 5,479,479 A | 12/1995 | Braitberg et al. |
| 5,488,352 A | 1/1996 | Jasper |
| 5,521,815 A | 5/1996 | Rose |
| 5,572,192 A | 5/1996 | Berube |
| 5,541,845 A | 7/1996 | Klein |
| 5,546,305 A | 8/1996 | Kondo |
| 5,557,254 A | 9/1996 | Johnson et al. |
| 5,557,268 A | 9/1996 | Hughes et al. |
| 5,499,182 A | 12/1996 | Ousborne |
| 5,585,552 A | 12/1996 | Heuston et al. |
| 5,594,650 A | 1/1997 | Shah et al. |
| 5,596,501 A | 1/1997 | Comer et al. |
| 5,600,323 A | 4/1997 | Boschini |
| 5,623,258 A | 4/1997 | Dorfman |
| 5,629,678 A | 5/1997 | Gargano et al. |
| 5,631,832 A | 5/1997 | Hagenbuch |
| 5,671,158 A | 9/1997 | Fournier et al. |
| 5,680,328 A | 10/1997 | Skorupski et al. |
| 5,610,596 A | 11/1997 | Petitclerc |
| 5,719,771 A | 2/1998 | Buck et al. |
| 5,731,893 A | 3/1998 | Dominique |
| 5,732,074 A | 3/1998 | Spaur et al. |
| 5,742,915 A | 4/1998 | Stafford |
| 5,745,049 A | 4/1998 | Akiyama et al. |
| 5,754,137 A | 5/1998 | Durrstein |
| 5,758,299 A | 5/1998 | Sandborg et al. |
| 5,758,300 A | 5/1998 | Abe |
| 5,781,871 A | 7/1998 | Mezger et al. |
| 5,808,565 A | 9/1998 | Matta et al. |
| 5,809,437 A | 9/1998 | Breed |
| 5,815,071 A | 9/1998 | Doyle |
| 5,835,871 A | 10/1998 | Smith et al. |
| 5,794,164 A | 11/1998 | Beckert et al. |
| 5,838,251 A | 11/1998 | Brinkmeyer et al. |
| 5,839,112 A | 11/1998 | Schreitmueller et al. |
| 5,867,404 A | 2/1999 | Bryan |
| 5,874,891 A | 2/1999 | Lowe |
| 5,884,202 A | 3/1999 | Arjomand |
| 5,890,061 A | 3/1999 | Timm et al. |
| 5,890,520 A | 6/1999 | Johnson, Jr. |
| 5,913,180 A | 6/1999 | Ryan |
| 5,922,037 A | 7/1999 | Potts |
| 5,923,572 A | 7/1999 | Pollock |
| 5,929,777 A * | 7/1999 | Reynolds ............. G08B 25/016 250/339.14 |
| 5,942,753 A | 8/1999 | Dell |
| 5,956,259 A | 9/1999 | Hartsell, Jr. et al. |
| 5,987,377 A | 11/1999 | Westerlage |
| 5,995,898 A | 11/1999 | Tuttle |
| 6,009,355 A | 12/1999 | Obradovich et al. |
| 6,009,363 A | 12/1999 | Beckert et al. |
| 6,016,795 A | 1/2000 | Ohki |
| 6,024,142 A | 2/2000 | Bates |
| 6,025,776 A | 2/2000 | Matsuura |
| 6,043,661 A | 3/2000 | Gutierrez |
| 6,127,947 A | 3/2000 | Uchida et al. |
| 6,128,551 A | 3/2000 | Davis et al. |
| 6,054,950 A | 4/2000 | Fontana |
| 6,061,614 A | 5/2000 | Carrender et al. |
| 6,064,299 A | 5/2000 | Lesesky et al. |
| 6,070,156 A | 5/2000 | Hartsell, Jr. |
| 6,078,255 A | 6/2000 | Dividock et al. |
| 6,084,870 A | 7/2000 | Wooten et al. |
| 6,092,021 A | 7/2000 | Ehlbeck et al. |
| 6,107,915 A | 8/2000 | Reavell et al. |
| 6,107,917 A | 8/2000 | Carrender et al. |
| 6,112,152 A | 8/2000 | Tuttle |
| 6,128,959 A | 10/2000 | McGovern et al. |
| 6,169,943 B1 | 1/2001 | Simon et al. |
| 6,169,938 B1 | 2/2001 | Hartsell, Jr. |
| 6,202,008 B1 | 3/2001 | Beckert et al. |
| 6,208,948 B1 | 3/2001 | Klingler et al. |
| 6,256,579 B1 | 3/2001 | Tanimoto |
| 6,285,953 B1 | 4/2001 | Harrison et al. |
| 6,236,911 B1 | 5/2001 | Kruger |
| 6,240,365 B1 | 5/2001 | Bunn |
| 6,199,099 B1 | 6/2001 | Gershman et al. |
| 6,253,129 B1 | 6/2001 | Jenkins et al. |
| 6,263,273 B1 | 7/2001 | Henneken et al. |

(56) References Cited

U.S. PATENT DOCUMENTS

| | | | |
|---|---|---|---|
| 6,263,276 B1 | 7/2001 | Yokoyama et al. |
| 6,278,936 B1 | 8/2001 | Jones |
| 6,295,492 B1 | 9/2001 | Lang et al. |
| 6,259,358 B1 | 10/2001 | Fjordbotten |
| 6,330,499 B1 | 11/2001 | Chou et al. |
| 6,339,745 B1 | 1/2002 | Novik |
| 6,362,730 B2 | 3/2002 | Razavi et al. |
| 6,370,454 B1 | 4/2002 | Moore |
| 6,374,176 B1 | 4/2002 | Schmier et al. |
| 6,396,413 B2 | 5/2002 | Hines et al. |
| 6,411,203 B1 | 6/2002 | Leseskey et al. |
| 6,411,891 B1 | 6/2002 | Jones |
| 6,417,760 B1 | 7/2002 | Mabuchi |
| 6,438,472 B1 | 8/2002 | Tano et al. |
| 6,450,411 B1 | 9/2002 | Rash et al. |
| 6,456,039 B1 | 9/2002 | Lauper et al. |
| 6,502,030 B2 | 12/2002 | Hilleary |
| 6,505,106 B1 | 1/2003 | Lawrence |
| 6,507,810 B2 | 1/2003 | Razavi et al. |
| 6,614,392 B2 | 2/2003 | Howard |
| 6,539,296 B2 | 3/2003 | Diaz et al. |
| 6,529,723 B1 | 4/2003 | Bentley |
| 6,529,808 B1 | 4/2003 | Diem |
| 6,604,033 B1 | 5/2003 | Banet et al. |
| 6,587,768 B2 | 7/2003 | Chen et al. |
| 6,594,579 B1 | 7/2003 | Lowrey et al. |
| 6,594,621 B1 | 7/2003 | Meeker |
| 6,597,973 B1 | 7/2003 | Barich et al. |
| 6,600,990 B2 | 7/2003 | Takenaga |
| 6,608,554 B2 | 8/2003 | Leseskey et al. |
| 6,609,082 B2 | 8/2003 | Wagner |
| 6,611,740 B2 | 8/2003 | Lowery et al. |
| 6,616,036 B2 | 9/2003 | Streicher et al. |
| 6,621,452 B2 | 9/2003 | Knockeart et al. |
| 6,636,790 B1 | 10/2003 | Lightner et al. |
| 6,664,897 B2 | 12/2003 | Pape et al. |
| 6,671,646 B2 | 12/2003 | Manegold et al. |
| 6,680,694 B1 | 1/2004 | Knockeart et al. |
| 6,744,352 B2 | 1/2004 | Lesesky et al. |
| 6,700,506 B1 | 3/2004 | Winkler |
| 6,708,113 B1 | 3/2004 | Von Gerlach et al. |
| 6,714,859 B2 | 3/2004 | Jones |
| 6,727,818 B1 | 4/2004 | Wildman et al. |
| 6,732,031 B1 | 5/2004 | Lightner et al. |
| 6,732,032 B1 | 5/2004 | Banet et al. |
| 6,801,841 B2 | 5/2004 | Tabe |
| 6,754,183 B1 | 6/2004 | Razavi et al. |
| 6,768,994 B1 | 7/2004 | Howard et al. |
| 6,816,762 B2 | 9/2004 | Hensey et al. |
| 6,804,606 B2 | 12/2004 | Jones |
| 6,804,626 B2 | 12/2004 | Manegold et al. |
| 6,834,259 B1 | 12/2004 | Markwitz et al. |
| 6,856,820 B1 | 2/2005 | Kolls |
| 6,924,750 B2 | 2/2005 | Flick |
| 6,876,642 B1 | 4/2005 | Adams et al. |
| 6,879,910 B2 | 4/2005 | Shike |
| 6,880,390 B2 | 4/2005 | Emord |
| 6,952,645 B1 | 4/2005 | Jones |
| 6,894,617 B2 | 5/2005 | Richman |
| 6,899,151 B1 | 5/2005 | Latka et al. |
| 6,904,359 B2 | 6/2005 | Jones |
| 6,909,947 B2 | 6/2005 | Douros et al. |
| 6,972,668 B2 | 6/2005 | Schauble |
| 6,928,348 B1 | 9/2005 | Lightner et al. |
| 6,946,953 B2 | 9/2005 | Lesesky et al. |
| 6,954,689 B2 | 10/2005 | Hanson et al. |
| 6,957,133 B1 | 10/2005 | Hunt et al. |
| 6,879,894 B1 | 12/2005 | Lightner et al. |
| 6,988,033 B1 | 1/2006 | Lowrey et al. |
| 7,003,289 B1* | 2/2006 | Koi .................. G07C 5/008 455/422.1 |
| 7,117,121 B2 | 3/2006 | Brinton et al. |
| 7,022,018 B2 | 4/2006 | Koga |
| 7,048,185 B2 | 5/2006 | Hart et al. |
| 7,068,301 B2 | 6/2006 | Thompson |
| 7,080,778 B1 | 7/2006 | Kressin et al. |
| 7,089,110 B2 | 8/2006 | Pechatnikov |
| 7,103,460 B1 | 9/2006 | Breed |
| 7,113,127 B1 | 9/2006 | Banet et al. |
| 7,027,955 B2 | 11/2006 | Markwitz et al. |
| 7,155,199 B2 | 12/2006 | Zalewski et al. |
| 7,171,372 B2 | 1/2007 | Daniel et al. |
| 7,225,065 B1 | 5/2007 | Hunt et al. |
| 7,174,243 B1 | 6/2007 | Lightner et al. |
| 7,174,277 B2 | 6/2007 | Vock et al. |
| 7,228,211 B1 | 6/2007 | Lowrey et al. |
| 7,254,516 B2 | 7/2007 | Case, Jr. et al. |
| 7,362,229 B2* | 4/2008 | Brinton .................. G07C 5/008 340/10.6 |
| 7,447,574 B1 | 4/2008 | Washicko et al. |
| 7,421,334 B2 | 9/2008 | Dahlgreen et al. |
| 7,343,252 B2 | 11/2008 | Wiens |
| 7,477,968 B1 | 1/2009 | Lowrey et al. |
| 7,480,551 B1 | 1/2009 | Lowrey et al. |
| 7,523,159 B1 | 4/2009 | Williams et al. |
| 7,557,696 B2 | 7/2009 | Brinton et al. |
| 7,564,375 B2 | 7/2009 | Brinton |
| 7,596,437 B1 | 9/2009 | Hunt et al. |
| 7,604,169 B2 | 10/2009 | Demere |
| 7,532,962 B1 | 12/2009 | Lowrey et al. |
| 7,532,963 B1 | 12/2009 | Lowrey et al. |
| 7,627,546 B2 | 12/2009 | Moser et al. |
| 7,640,185 B1 | 12/2009 | Giordano et al. |
| 7,650,210 B2 | 1/2010 | Breed |
| 7,672,756 B2 | 2/2010 | Breed |
| 7,672,763 B1 | 2/2010 | Hunt et al. |
| 7,680,595 B2 | 3/2010 | Brinton et al. |
| 7,778,752 B1 | 8/2010 | Hunt et al. |
| 7,783,507 B2 | 8/2010 | Schick et al. |
| 8,086,523 B1 | 12/2011 | Palmer |
| 8,090,713 B2* | 1/2012 | Tong ................. G06F 16/951 707/723 |
| 8,120,473 B2 | 2/2012 | Rennie et al. |
| 8,140,250 B2 | 3/2012 | Mian et al. |
| 8,156,484 B2* | 4/2012 | Smith .................... G06F 9/445 707/716 |
| 8,400,296 B2* | 3/2013 | Brinton .................. G08G 1/20 340/539.24 |
| 8,407,139 B1 | 3/2013 | Palmer |
| 8,498,809 B2 | 7/2013 | Bill |
| 8,650,210 B1* | 2/2014 | Cheng .................. G06F 3/167 707/770 |
| 8,655,540 B2 | 2/2014 | Mian et al. |
| 8,768,543 B2 | 7/2014 | Kumar et al. |
| 8,810,385 B2* | 8/2014 | McQuade .............. G08G 1/20 340/439 |
| 8,972,097 B2* | 3/2015 | McQuade .............. G08G 1/20 701/117 |
| 8,972,179 B2 | 3/2015 | Brinton |
| 9,092,968 B2* | 7/2015 | Brinton .................. G08G 1/20 |
| 9,430,799 B2* | 8/2016 | Sivadasan ............ G06Q 40/02 |
| 2001/0010028 A1 | 7/2001 | Thibault |
| 2001/0047283 A1 | 11/2001 | Melick et al. |
| 2001/0053983 A1 | 12/2001 | Reichwein et al. |
| 2002/0016655 A1* | 2/2002 | Joao .................... G07C 5/085 701/33.4 |
| 2002/0022979 A1 | 2/2002 | Whipp et al. |
| 2002/0022984 A1 | 2/2002 | Daniel et al. |
| 2002/0023215 A1* | 2/2002 | Wang .................. G06Q 20/00 713/171 |
| 2002/0052965 A1* | 5/2002 | Dowling ............ G06Q 20/3224 709/230 |
| 2002/0054159 A1* | 5/2002 | Obradovich ........ G01C 21/3694 715/839 |
| 2002/0065698 A1 | 5/2002 | Schick et al. |
| 2002/0072808 A1* | 6/2002 | Li ...................... G06Q 30/02 700/5 |
| 2002/0089434 A1 | 7/2002 | Ghazarian |
| 2002/0163449 A1 | 7/2002 | Flick |
| 2002/0101447 A1* | 8/2002 | Carro .................... G06Q 10/10 715/760 |
| 2002/0104013 A1 | 8/2002 | Ghazarian |
| 2002/0107833 A1 | 8/2002 | Kerkinni |

(56) References Cited

U.S. PATENT DOCUMENTS

| | | |
|---|---|---|
| 2002/0107873 A1 | 8/2002 | Winkler et al. |
| 2002/0111725 A1 | 8/2002 | Burge |
| 2002/0122569 A1 | 9/2002 | Coffelt |
| 2002/0122583 A1 | 9/2002 | Thompson |
| 2002/0133273 A1 | 9/2002 | Lowrey et al. |
| 2002/0133275 A1 | 9/2002 | Thibault |
| 2002/0143860 A1* | 10/2002 | Catan .................... G06F 16/955 709/203 |
| 2002/0147610 A1 | 10/2002 | Tabe |
| 2002/0150050 A1 | 10/2002 | Nathanson |
| 2002/0156558 A1 | 10/2002 | Hanson et al. |
| 2002/0178147 A1 | 11/2002 | Arroyo et al. |
| 2002/0188593 A1 | 12/2002 | Moser et al. |
| 2003/0004644 A1 | 1/2003 | Farmer |
| 2003/0030550 A1 | 2/2003 | Talbot |
| 2003/0033061 A1 | 2/2003 | Chen et al. |
| 2003/0040654 A1* | 2/2003 | Linn .................... C10H 1/00 585/534 |
| 2003/0040854 A1* | 2/2003 | Rendahl ............. G01N 21/3504 701/31.4 |
| 2003/0065541 A1* | 4/2003 | Menninger .......... G06Q 10/063 705/7.11 |
| 2003/0069766 A1* | 4/2003 | Hoffman ................ G06Q 10/06 705/7.25 |
| 2003/0083944 A1* | 5/2003 | Duvall ................ G06Q 20/202 705/21 |
| 2003/0120745 A1 | 6/2003 | Katagishi et al. |
| 2003/0135295 A1 | 7/2003 | Dor |
| 2003/0206133 A1 | 11/2003 | Cheng |
| 2003/0109973 A1 | 12/2003 | Hensey et al. |
| 2004/0009819 A1 | 1/2004 | Koga |
| 2004/0236596 A1 | 11/2004 | Chowdhary et al. |
| 2005/0065711 A1 | 3/2005 | Dahlgreen et al. |
| 2005/0203683 A1 | 9/2005 | Olsen et al. |
| 2005/0206534 A1 | 9/2005 | Yamane |
| 2005/0211777 A1* | 9/2005 | Wetzel .................... G07C 3/14 235/385 |
| 2005/0273250 A1 | 12/2005 | Hamilton et al. |
| 2006/0011721 A1* | 1/2006 | Olsen, III ............ G06Q 10/087 235/385 |
| 2006/0055564 A1 | 3/2006 | Olsen et al. |
| 2006/0202030 A1 | 9/2006 | Kressin et al. |
| 2006/0208075 A1 | 9/2006 | Kressin et al. |
| 2006/0208087 A1 | 9/2006 | Kressin et al. |
| 2006/0232406 A1 | 10/2006 | Filibeck |
| 2007/0050193 A1 | 3/2007 | Larson |
| 2007/0069947 A1 | 3/2007 | Banet et al. |
| 2007/0162401 A9 | 7/2007 | Himes |
| 2007/0179709 A1 | 8/2007 | Doyle |
| 2007/0294031 A1 | 12/2007 | Brinton et al. |
| 2008/0154489 A1 | 6/2008 | Kaneda et al. |
| 2008/0154712 A1 | 6/2008 | Wellman |
| 2008/0319665 A1 | 12/2008 | Berkobin et al. |
| 2009/0018859 A1 | 1/2009 | Purifoy et al. |
| 2009/0055041 A1 | 2/2009 | Mian et al. |
| 2009/0055043 A1 | 2/2009 | Mian et al. |
| 2009/0055812 A1* | 2/2009 | Smith .................... G06F 9/445 717/154 |
| 2009/0177350 A1 | 7/2009 | Williams et al. |
| 2009/0222200 A1 | 9/2009 | Link, II et al. |
| 2009/0237245 A1 | 9/2009 | Brinton |
| 2009/0069999 A1 | 12/2009 | Bos |
| 2010/0088127 A1 | 8/2010 | Betancourt et al. |
| 2011/0054730 A1* | 3/2011 | Knight .................... G07C 5/008 701/29.5 |
| 2011/0238643 A1* | 9/2011 | Tong .................... G06F 16/951 707/706 |
| 2012/0010774 A1 | 1/2012 | McQuade et al. |
| 2012/0136802 A1 | 5/2012 | McQuade et al. |
| 2012/0284012 A1* | 11/2012 | Rodriguez ............. G06Q 30/06 704/1 |
| 2013/0073306 A1* | 3/2013 | Shlain .................. G06Q 10/06 705/2 |
| 2014/0200760 A1 | 7/2014 | Kaufmann et al. |
| 2014/0365335 A1* | 12/2014 | Tyshuk .............. G06Q 30/0623 705/26.61 |
| 2015/0021397 A1* | 1/2015 | Rueblinger .......... G06K 7/1443 235/462.08 |
| 2015/0170521 A1 | 6/2015 | McQuade et al. |
| 2016/0012465 A1* | 1/2016 | Sharp .................... G06Q 20/18 705/14.17 |
| 2018/0089622 A1* | 3/2018 | Burch, V ............. G05D 1/0094 |
| 2020/0361634 A1* | 11/2020 | Gil ......................... G07C 5/008 |

FOREIGN PATENT DOCUMENTS

| | | |
|---|---|---|
| CA | 2326892 | 6/2005 |
| EP | 0755039 | 1/1997 |
| EP | 0814447 | 5/1997 |
| EP | 0926020 | 6/1999 |
| EP | 1271374 | 6/2002 |
| EP | 1005627 | 10/2003 |
| EP | 1027792 | 1/2004 |
| EP | 2116968 | 11/2009 |
| JP | 2001280985 | 10/2001 |
| WO | WO97026750 | 7/1997 |
| WO | WO98003952 | 1/1998 |
| WO | WO98030920 | 7/1998 |
| WO | WO03023550 | 3/2003 |
| WO | WO07092711 | 8/2007 |

OTHER PUBLICATIONS

Exploring the implications of m-commerce for markets and marketing; S Balasubraman, RA Peterson . . . —Journal of the . . . , 2002—journals.sagepub.com (Year: 2002).*

The evolution of global positioning system (GPS) technology; S Kumar, KB Moore—Journal of science Education and Technology, 2002—Springer (Journal of Science Education and Technology vol. 11, pp. 59-80 (Mar. 2002)). (Year: 2002).*

Anthony LaMarca et al, Location Systems: An Introduction to the Technology Behind Location Awareness; Synthesis Lectures on Mobile and Pervasive Computing; 2008, 122 pages, (https://doi.org/10.2200/S00115ED1V01Y200804MPC004) (https://www.morganclaypool.com/doi/abs/10.2200/S00115ED1V01Y200804MPC) (Year: 2008).*

"The Evolution of Global Positioning System (GPS) Technology" by Sameer Kumar and Kevin B. Moore, Journal of Science Education and Technology; vol. 11, No. 1 (Mar., 2002), pp. 59-80 (22 pages) (Year: 2002).*

An Abstract of "Location Systems: An Introduction to the Technology Behind Location Awareness" by Anthony LaMarca and Eyal de Lara Synthesis Lectures on Mobile and Pervasive Computing, 2008, vol. 3, No. 1 , pp. 1-122 (https://doi.org/10.2200/S00115ED1V01Y200804MPC004) (Year: 2008).*

Exploring the Implications of M-Commerce for Markets and Marketing by Sridhar Balasubramanian and R. Peterson; Journal of the Academy of Marketing Science, 2002 (Year: 2002).*

C. Steinfield, T. Adelaar and Ying-ju Lai, "Integrating brick and mortar locations with e-commerce: understanding synergy opportunities," Proceedings of the 35th Annual Hawaii International Conference on System Sciences, 2002, pp. 2920-2929, doi: 10.1109/HICSS.2002.994254. (Year: 2002).*

"D.O.T. Driver Vehicle Inspection Reports on your wireless phone!" FleeTTrakkeR LLC 2002-2003 FleeTTrakkeR LLC . All rights reserved <http://www. fleettrakker.com/web/index. jsp> Accessed Mar. 12, 2004.

"Detex Announces the Latest Innovation in Guard Tour Verification Technology." DETEX Life Safety, Security and Security Assurance. Jan. 1, 2003. Ipp. © 2002-2004 Detex Corporation. <http://www.detex.com/NewsAction.jspa?id=3>.

"Nextel, Motorola and Symbol Technologies Offer First Wireless Bar Code Scanner for Mobile Phones." Jun. 11, 2003. <http://theautochannel.com/news/2003/06/11/162927 .htm>.

"OBD Up." MOTOR: 28-34, Jul. 1998.

"The Data Acquisition Unit Escorte." The Proxi Escort.com. Nov. 20, 2001. 4pp. Copyright © 2000 GCS General Control Systems. <http://www.gcs.at/eng/produkte/hw/escorte.htm>.

(56) References Cited

OTHER PUBLICATIONS

"The PenMaster" and "The PSION Workabout." Copyright 2000 GCS General Control Systems. <http://www.gcs.at/eng/produkte/hw/penmaster.htm>.

"Tracking out of route: software helps fleets compare planned routes to actual miles. (Technology)." Commercial Carrier Journal. Published Oct. 1, 2005. 4pp. NDN-219-1054-1717-0.

"Transit agency builds GIS to plan bus routes." American City & County. vol. 118, No. 4. Published Apr. 1, 2003. 4pp. NDN-258-0053-0664-6.

"What is the Child Check-Mate Safety System"? 2002 © Child Checkmate Systems Inc. <http://www. childcheckmate. com/what.html>.

Albright, Brian: "Indiana Embarks on Ambitious RFID roll out." Frontline Solutions. May 20, 2002; 2pp. Available at: <http://www.frontlinetoday .com/frontline/ article/articleDetail.jsp?id= 19358>.

Contact: GCS (UK), Tewkesbury Gloucestershire. Dec. 11, 2002. 2pp. Copyright © 2000 GCS General Control Systems <http://www.gcs.at?eng/news allegemein.htm>.

Dwyer, H.A., et al. Abstract: "Analysis of the Performance and Emissions of Different Bus Technologies on the city of San Francisco Routes." Technical paper published by Society of Automotive Engineers, Inc. Published Oct. 26, 2004. 2pp. NDN-116-0014-3890-6.

Guensler et al., "Development of a Comprehensive Vehicle Instrumentation Package for Monitoring Individual Tripmaking Behavior." Georgia Institute of Technology: School of Civil and Environmental Engineering: 31pp., Feb. 1999.

Jenkins et al., "Real-Time Vehicle Performance Monitoring Using Wireless Networking." IASTED International Conference on Communications, Internet, and Information Technology: 375-380, Nov. 22-24, 2004.

Kurtz, Jennifer. "Indiana 's E-Government: A Story Behind It's Ranking." INCONTEXT Indiana; s Workforce and Economy. Jan.-Feb. 2003 vol. 4, No. 5pp. Available at <http://www.incontext.indiana.edu/2003/jan-feb03/govemement.html>.

Kwon, W., "Networking Technologies ofIn-Vehicle." Seoul National University: School of electrical engineering: 44pp., Mar. 8, 2000.

Leavitt, Wendy., "The Convergence Zone." FleetOwner, 4pp. <www.driversmag.com/ar/fleet_convergence_zone/Index.html> 1998.

Miras. "About SPS Technologies." lpg., May 7, 1999.

Miras. "How MIRAS Works." lpg., Apr. 29, 1999.

Miras. "Miras 4.0 Screenshot." lpg., May 7, 1999. Miras. "MIRAS Unit." lpg., May 4, 1999.

Miras. "Monitoring Vehicle Functions." 1pg., Apr. 27, 1999 Miras. "Remote Control." 1pg., Apr. 29, 1999.

Miras. "Tracking & Monitoring Software." lpg., Apr. 29, 1999.

N.a., "MIRAS GPS vehicle tracking using the Internet." Business Wire, 2pp., Nov. 22, 1996.

N.a., "Private fleets moving to wireless communications." FleetOwner, 4pp. <www.driversmag.com/ar/fleet_private_fleets_moving/index.html> 1997.

Quaan et al., "Guard Tour Systems. " Security Management Online. Sep. 16, 2003. 1pg. © 2000 <http://www.securitymanagement.com/ubb/Forum30/HTML/000066.html>.

Qualcomm. "Object FX Integrates TrackingAdvisor with QUALCOMM's FleetAdvisor System; Updated Version Offers Benefit of Visual Display of Vehicles and Routes to Improve Fleet Productivity." Source: Newswire. Published Oct. 27, 2003. 4pp. NDN-121-0510-3002-5.

Senger, Nancy. "Inside RF/ID: Carving a Niche Beyond Asset Tracking." Business Solutions. Feb. 1999: 5pp. Available at: <http://www.businesssolutionsmag.com/ Articles/1999 _02/990208 .html>.

Sterzbach et al., "A Mobile Vehicle On-Board Computing and Communication System." Comput. & Graphics, vol. 20, No. 4: 659-667, 1996.

Tiscor: Inspection Manager 6.0 User Guide. USA; 2004. 1-73.

Tiscor: The Mobile Software Solutions Provider. Inspection Manager: An Introduction. Sep. 27, 2004. Slide presentation; 19pp. Available: www.TISCOR.com.

Tsakiri, M et al. Abstract: "Urban fleet monitoring with GPS and GLONASS." Journal of Navigation, vol. 51, No. 3. Published Sep. 1998. 2pp. NDN-174-0609-4097-3.

Tuttle, John R. "Digital RF/ID Enhances GPS" Proceedings of the Second Annual Wireless Symposium, pp. 406-411, Feb. 15-18, 1994, Santa Clara, CA.

Want, Roy, "RFIDA Key to Automating Everything." Scientific American, Jan. 2004, p. 58-65.

Zujkowski, Stephen. "Savi Technolgy, Inc.: Savi Security and Productivity Systems." ATA Security Forum 2002, Chicago, IL: 21pp., May 15, 2002.

Office actions from U.S. Appl. No. 14/630,371 dated Oct. 26, 2015, dated Jul. 11, 2016, dated Jan. 17, 2017 and dated Aug. 14, 2017.

* cited by examiner

DRIVER'S VEHICLE INSPECTION REPORT
AS REQUIRED BY THE D.O.T. FEDERAL MOTOR CARRIER SAFETY REGULATIONS

CARRIER: _______________________________________________

ADDRESS: _______________________________________________

DATE: _______________ TIME: __________ A.M. __________ P.M.

CHECK ANY DEFECTIVE ITEM AND GIVE DETAILS UNDER "REMARKS"

TRACTOR/
TRUCK NO. _______________ ODOMETER READING _______________

- ☐ AIR COMPRESSOR
- ☐ AIR LINES
- ☐ BATTERY
- ☐ BODY
- ☐ BRAKE ACCESSORIES
- ☐ BRAKES, PARKING
- ☐ BRAKES, SERVICE
- ☐ CLUTCH
- ☐ COUPLING DEVICE
- ☐ DEFROSTER/HEATER
- ☐ DRIVE LINE
- ☐ ENGINE
- ☐ EXHAUST
- ☐ FIFTH WHEEL
- ☐ FRAME AND ASSEMBLY
- ☐ FRONT AXLE
- ☐ FUEL TANKS
- ☐ GENERATOR

- ☐ HORN
- ☐ LIGHTS
  - HEAD - STOP
  - TAIL - DASH
  - TURN INDICATORS
- ☐ MIRRORS
- ☐ MUFFLER
- ☐ OIL PRESSURE
- ☐ RADIATOR
- ☐ REAR END
- ☐ REFLECTORS
- ☐ SAFETY EQUIPMENT
  - FIRE EXTINGUISHER
  - REFLECTIVE TRIANGLES
  - FLAGS - FLARES - FUSEES
  - SPARE BULBS & FUSES
  - SPARE SEAL BEAM

- ☐ SUSPENSION SYSTEM
- ☐ STARTER
- ☐ STEERING
- ☐ TACHOGRAPH
- ☐ TIRES
- ☐ TIRE CHAINS
- ☐ TRANSMISSION
- ☐ WHEELS AND RIMS
- ☐ WINDOWS
- ☐ WINDSHIELD WIPERS
- ☐ OTHER

TRAILER(S) NO.(S) _______________

- ☐ BRAKE CONNECTIONS
- ☐ BRAKES
- ☐ COUPLING DEVICES
- ☐ COUPLING (KING) PIN
- ☐ DOORS

- ☐ HITCH
- ☐ LANDING GEAR
- ☐ LIGHTS - ALL
- ☐ ROOF
- ☐ SUSPENSION SYSTEM

- ☐ TARPAULIN
- ☐ TIRES
- ☐ WHEELS AND RIMS
- ☐ OTHER

REMARKS: _______________________________________________
_______________________________________________________
_______________________________________________________
_______________________________________________________
_______________________________________________________
_______________________________________________________
_______________________________________________________

☐ CONDITION OF THE ABOVE VEHICLE IS SATISFACTORY

DRIVER'S SIGNATURE: _______________________________________

☐ ABOVE DEFECTS CORRECTED
☐ ABOVE DEFECTS NEED NOT BE CORRECTED FOR SAFE OPERATION OF VEHICLE
MECHANIC'S SIGNATURE: _____________________________ DATE: _______

DRIVER'S SIGNATURE: _______________________________ DATE: _______

SYSTEM AND METHOD TO ENHANCE THE UTILITY OF VEHICLE INSPECTION RECORDS BY INCLUDING ROUTE IDENTIFICATION DATA IN EACH VEHICLE INSPECTION RECORD

RELATED APPLICATIONS

This application is a continuation of application Ser. No. 14/630,371, filed Feb. 24, 2015 which itself is a continuation-in-part of application Ser. No. 13/159,182, filed on Jun. 13, 2011 and issued as U.S. Pat. No. 8,972,097 on Mar. 3, 2015, which itself is a continuation-in-part of application Ser. No. 12/942,874, filed on Nov. 9, 2010, which itself is a continuation-in-part of application Ser. No. 12/724,232, filed on Mar. 15, 2010, and issued as U.S. Pat. No. 8,972,179 on Mar. 3, 2015, which itself is a continuation-in-part of prior co-pending application Ser. No. 11/675,502, filed on Feb. 15, 2007 and issued as U.S. Pat. No. 7,680,595 on Mar. 16, 2010, which is itself a continuation-in-part of application Ser. No. 11/425,222, filed on Jun. 20, 2006, and issued as U.S. Pat. No. 7,564,375 on Jul. 21, 2009, which itself is a continuation-in-part of prior co-pending application Ser. No. 11/247,953, filed on Oct. 11, 2005, and issued as U.S. Pat. No. 7,362,229 on Apr. 22, 2008, which itself is a continuation-in-part of application Ser. No. 10/915,957, filed on Aug. 11, 2004 and issued as U.S. Pat. No. 7,557,696 on Jul. 7, 2009, which itself is a continuation-in-part of application Ser. No. 10/219,892, filed on Aug. 15, 2002, and issued as U.S. Pat. No. 6,804,626 on Oct. 12, 2004, which itself is a continuation-in-part of application Ser. No. 09/951,104, filed on Sep. 11, 2001 and issued as U.S. Pat. No. 6,671,646 on Dec. 30, 2003, the benefits of the filing dates of which are hereby claimed under 35 U.S.C. § 120.

BACKGROUND

Vehicle fleet operators often operate vehicles along predefined and generally invariant routes. For example, buses frequently operate on predefined routes, according to a predefined time schedule (for example, along a route that is geographically, as well as temporally defined). Fleet operators often assign specific vehicles to particular routes. Occasionally, maintenance issues necessitate changing the vehicles assigned to specific routes. It is often tedious and time-consuming for fleet operators to keep track of which route a particular vehicle has been assigned to at any given time.

Figure 4:
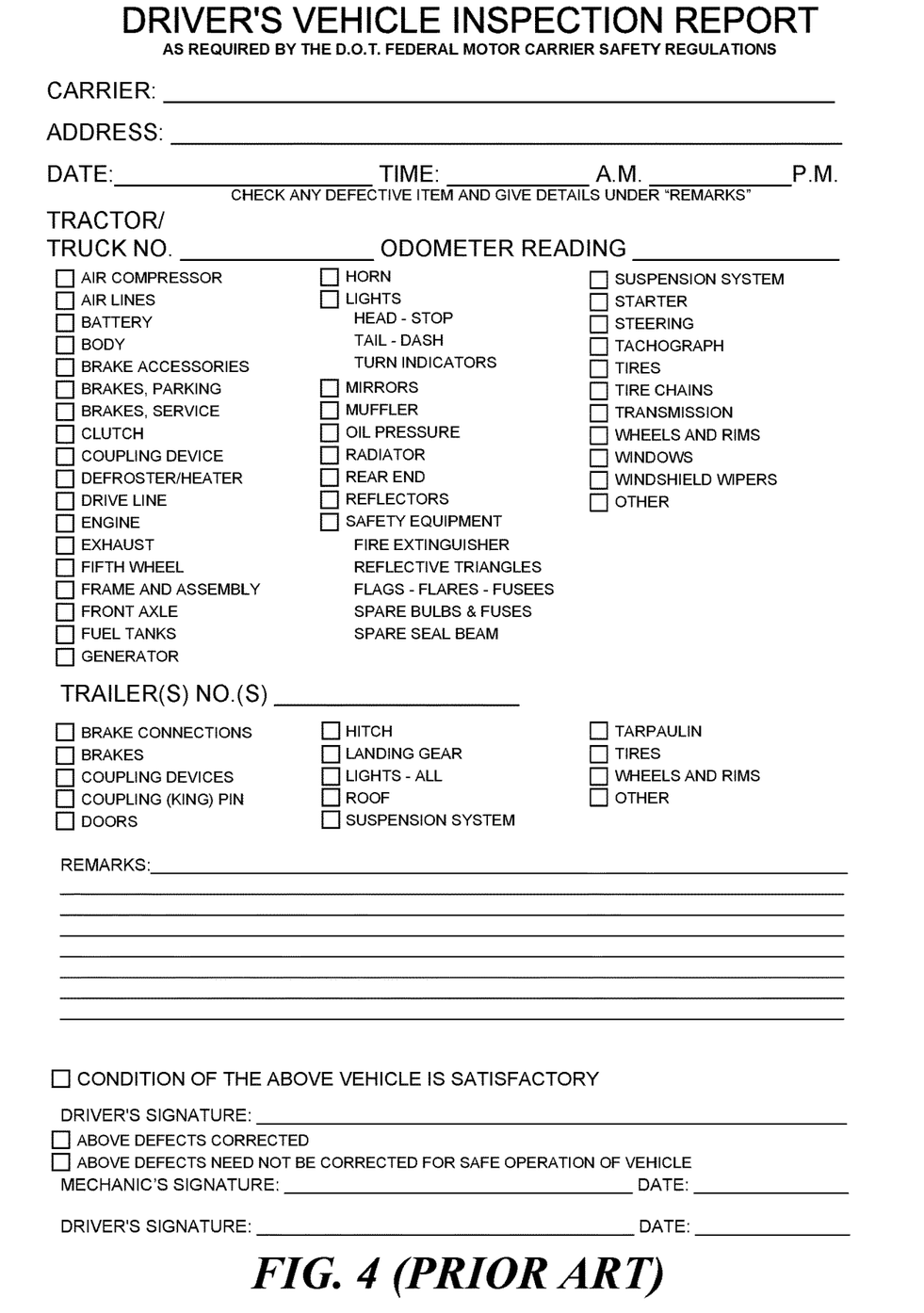
FIG. 4 (Prior Art) is an exemplary manually-completed inspection record used for safety inspections of tractors and trailers, illustrating the specific components and systems that are required to be inspected.

In addition to keeping track of what routes specific vehicles have serviced, fleet operators also must be concerned with complying with federal law, which presently requires that commercial drivers make a visual inspection of specific components on any type of vehicle which has a gross vehicle weight rating (GVWR) of 26,001 lbs (11,793 kgs) or more. Components for which inspection is required include the brake system, fuel system, warning lights, tires, etc. An exemplary vehicle inspection report listing the components and systems that must be inspected by a driver to satisfy the DOT regulations is illustrated in FIG. 4. Under the current system, a driver is only required to fill out a paper log and keep it on file for 90 days. Many experts report that less than half of the drivers ever perform the check. Instead, many drivers simply fill out the report while seated in the cab of the truck or in a coffee shop. The report is meaningless unless the listed components and systems have actually been inspected. For example, a driver who fails to actually inspect components on his vehicle will fail to detect that brake fluid is leaking from a hydraulic master brake cylinder. As a result, the brakes on the driver's truck may fail, potentially causing a serious accident.

It would be desirable to provide such fleet operators with method and apparatus to facilitate performing such important vehicle inspections, which also captures vehicle identification data and route identification data, so that fleet operators can more readily determine what route a particular vehicle serviced on a particular day, while also complying with the vehicle inspection requirements.

SUMMARY

This application specifically incorporates herein by reference the disclosures and drawings of each patent application and issued patent that is identified above as a related application.

Disclosed herein are method and apparatus for enabling route identification (ID) data to be readily collected during vehicle inspections that must be performed daily by commercial vehicle operators. An electronic inspection record including route ID data, vehicle ID data, and inspection data is automatically generated. If desired, driver ID data can also be included in the electronic inspection record. The electronic inspection record is conveyed to a remote computing device (i.e., a computing device remote from the vehicle that is inspected). Electronic inspection records for all fleet vehicles can be searched, to enable fleet operators to quickly determine what route a specific vehicle serviced on a specific day. It should be understood that the term electronic inspection record encompasses data stored in any type of file structure (i.e., different data types, such as driver ID data, vehicle ID data, route ID data, and inspection data can be stored as discrete files logically coupled with pointers to related data, or the different types of data can be stored together in a single data file defining the inspection record).

The electronic inspection record is generated when an operator uses a handheld device while performing the vehicle inspection. The handheld device records data relevant to the inspection to a non-transient memory. The electronic inspection record can be conveyed to a different non-transient memory remote from the vehicle, such that the electronic inspection record can be analyzed by a computing device remote from the vehicle. The electronic inspection record can be used as a record to verify that the inspection was performed. Significantly, the method and apparatus disclosed herein enhance the usefulness of archived vehicle inspection data, because the route ID data incorporated into the electronic inspection record will indicate which one of a plurality of predefined routes the vehicle will service (in the case of a pre-trip inspection) or has serviced (in the case of a post-trip inspection), so the fleet operator will be able to more readily determine what route a specific vehicle serviced on a specific date (noting that each electronic inspection record includes a date identifier, to enable the inspection data to be used to show compliance with inspection rules mandating daily inspections).

The route ID data included in the electronic inspection record uniquely identifies a specific one of the plurality of predefined routes. Thus, examination of the inspection record will enable the route ID data to be used to identify upon which one of a plurality of predefined routes the vehicle was operating during the time period corresponding to the electronic inspection record.

In general, the electronic inspection record will be analyzed by a remote computing device. For example, the remote computing device can be a computing system controlled or accessed by the fleet operator. The remote computing device also can be operating in a networked environment, and in some cases, may be operated by a third party under contract with the fleet operator to perform such services. Thus, the electronic inspection record including the route identification ID and the inspection data will be conveyed from the handheld device used to generate the electronic inspection record via a data link to the remote computing device.

An exemplary embodiment can be implemented using the following basic elements: a vehicle to be inspected, an operator to perform the vehicle inspection, an ID data input means (ID data to input include at least vehicle ID and route ID, and in some embodiments the driver ID can also be input), an inspection data collection means, a data link means, and a remote computing device. In general, the remote computing device can be implemented by a computing system employed by an entity operating a fleet of vehicles. Entities that operate vehicle fleets can thus use such computing systems to track and manipulate data relating to their vehicle fleet. It should be recognized that these basic elements can be combined in many different configurations to achieve the method defined above. Thus, the details provided herein are intended to be exemplary, and not limiting on the concepts disclosed herein.

A particularly useful implementation of the exemplary embodiment noted above involves a first alternative in which the electronic inspection record is stored in a memory associated with a portable data collection device used to perform the vehicle inspection, before being conveyed to the remote computing device for analysis. In a second alternative, the electronic inspection record is stored in a memory associated with a vehicular onboard computer, before being conveyed to the remote computing device for analysis.

When the inspection record is stored in a memory associated with a portable electronic data collection device, the operator can input the route ID data via a user interface, such that the route ID data are stored in the memory of the portable electronic data collection device. Such a portable electronic data collection device can be used not only to store the route ID, but also to collect and store other data collected in connection with the operation of the vehicle. The other data and the route ID data will typically be combined into a data set (i.e., an inspection record) unique to a specific operational period for a specific vehicle. The use of a portable electronic data collection device to collect inspection related data has been described in detail in commonly assigned U.S. Pat. No. 6,671,646, entitled SYSTEM AND PROCESS TO ENSURE PERFORMANCE OF MANDATED SAFETY AND MAINTENANCE INSPECTIONS, the specification and drawings of which are hereby specifically incorporated herein by reference. The use of a portable electronic data collection device to collect ancillary data (including sensor data such as brake temperature data, tire pressure data, oil temperature data, engine coolant temperature, geographic position data, and other data corresponding to operational characteristics and condition of the vehicle) has been described in detail in commonly assigned U.S. Pat. No. 7,362,229, entitled ENSURING THE PERFORMANCE OF MANDATED INSPECTIONS COMBINED WITH THE COLLECTION OF ANCILLARY DATA, the specification and drawings of which are hereby specifically incorporated herein by reference. The inspection record is then conveyed to a remote computing device for subsequent analysis of the inspection record, including analysis configured to identify which one of the plurality of predefined routes the vehicle was operating over during the period the inspection record was collected. The inspection record can be conveyed to the remote computing device in a variety of different ways. The inspection record can be extracted from the portable electronic data collection device using a wireless communication (such as radio frequency and IR data transfer), a hardwired interface, or portable memory storage media that can be moved to another location to extract the data. If desired, the inspection record can be transmitted to the remote computing device in real-time, if the portable electronic data collection device or vehicle is equipped with radio or cellular communication capability. The remote computing device will parse the inspection record to locate the route ID data, thereby enabling identification of which one of the plurality of predefined routes matches the route ID data, such that a specific one of the plurality of predefined routes can be identified as corresponding to the specific period during which the inspection record was collected.

When the inspection record is stored in a memory associated with an onboard computer, the operator can input the route ID data via a user interface, such that the route ID data are stored in the memory of the onboard computing device. Note in such an embodiment, a handheld data collection device (such as the device discussed above) will be used to collect the inspection data, which then must be conveyed to the vehicle onboard computer to be combined with the route ID data. Additional vehicle data can then be added to the inspection record by the onboard computer if desired. Vehicle onboard computing devices are often configured to collect data from a variety of sensors integrated into the vehicle. Such sensor data are often communicated to the onboard computer via a J-bus, although such an embodiment is intended to be exemplary, rather than limiting. Sensor data can include brake temperature data, tire pressure data, oil temperature data, engine coolant temperature data, geographic position data, and other data corresponding to operational characteristics or conditions of the vehicle. The sensor data and the route ID data can, in this exemplary embodiment, be combined into an inspection record unique to a specific operational period for a specific vehicle.

Regardless of whether the inspection record is stored in a handheld device used to perform the inspection, or in a memory logically coupled to an onboard vehicle computer, the inspection record (including at least the inspection data, the vehicle ID data, and the route ID data), is then conveyed to a remote computing device for subsequent analysis of the inspection record, including analysis that identifies upon which one of the plurality of predefined routes the vehicle was operating over during a time period proximate the inspection of the vehicle. The inspection record can be conveyed to the remote computing device in a variety of ways.

In a related exemplary embodiment, the inspection record also includes driver ID data. While it is important to be able to match the inspection record to a specific vehicle (to provide evidence that a specific vehicle was inspected), the vehicle ID data can be provided in many ways. For example, a particular handheld data collection device can be assigned to a specific vehicle, and handheld ID data can be included in the inspection record, so the handheld ID data is used to uniquely tie the inspection record to a specific vehicle. In embodiments where data from a vehicle's onboard computer is included in the inspection record, some of that data (for example, sensor ID data unique to a specific sensor on that vehicle, or a vehicle identification number (VIN) provided by the onboard computer) could be used to uniquely tie the inspection record to a specific vehicle.

Another aspect of the novel concepts presented herein is directed to a system and apparatus implementing the functional steps generally as described above.

The methods disclosed herein are preferably implemented by a processor (such as a computing device executing machine instructions to implement the specific functions noted above) or a custom circuit (such as an application specific integrated circuit). Further, the concepts disclosed herein also encompasses machine instructions stored on a non-transitory memory medium, which when executed by a processor implement one or more of the methods disclosed herein, and systems for implementing the disclosed methods. In one exemplary system, the basic elements include a computing device remote from the vehicle that implements the function of analyzing the electronic inspection record to identify at least one of the following parameters: a specific vehicle, a specific time, a specific driver, a specific fault identified in the inspection record, and a specific route identified in the inspection record. It should be understood that the term computing device encompasses computing environments including multiple processors and memory storage devices, where certain functions are implemented on different ones of the multiple processors. Thus, the term computing device not only encompasses single desktop and laptop computers, but also networked computers, including servers and clients, in private networks or as part of the Internet. The data being processed can be stored by one element in such a network, retrieved for review by another element in the network, and analyzed by yet another element in the network.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive. Further, it should be understood that any feature of one embodiment disclosed herein can be combined with one or more features of any other embodiment that is disclosed, unless otherwise indicated.

Figure 1:
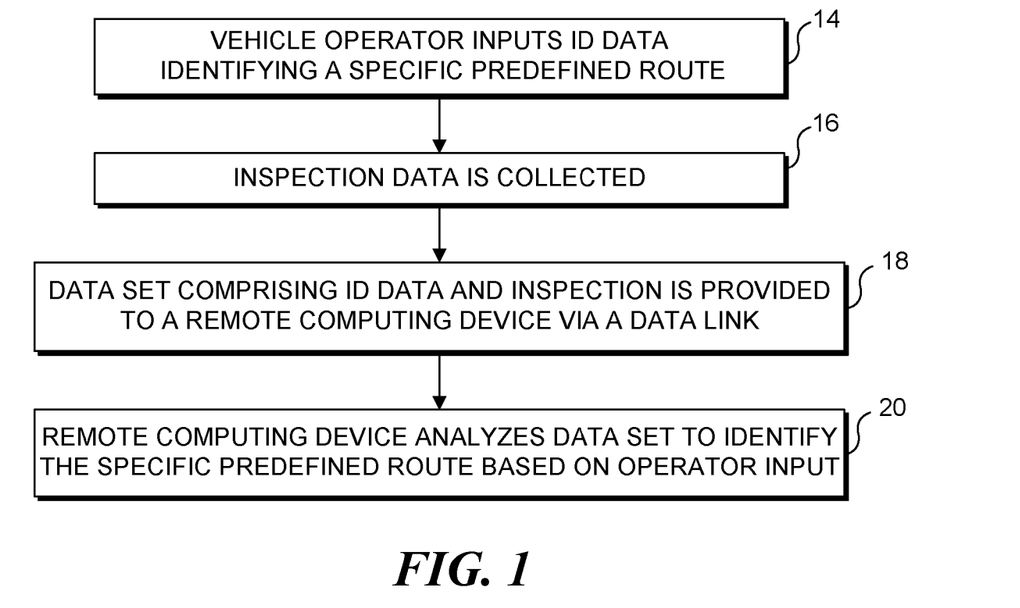
FIG. 1 is a high level logic diagram showing exemplary overall method steps implemented in accord with the concepts disclosed herein to identify a specific predefined route over which a vehicle has been operated by analyzing inspection data collected for the vehicle, where the timing of the inspection is correlated to the predefined route.

FIG. 1 is a high level flow chart showing the overall method steps implemented in accord with one aspect of the concepts disclosed herein. In a block 14, a user (hereafter referred to as the operator, since generally, the user will be the operator of the vehicle, although it should be recognized that other individuals, such as fleet maintenance personnel or supervisors, can be assigned to carry out this and other tasks discussed herein) inputs route ID data into a memory, so that the route ID data can be combined with inspection data to generate an inspection record corresponding to a specific vehicle operated during a specific period of time. As described in greater detail below, in a first exemplary embodiment, the memory is associated with a portable electronic device used by the operator to collect the other data. In a second exemplary embodiment, the memory is incorporated into the vehicle (such as memory associated with an onboard computer).

In a block 16, inspection data for the vehicle are collected before (in the case of a pre-trip inspection) or after (in the case of a post-trip inspection) the vehicle is operated over the predefined route identified in block 14. To enable inspection records to be correlated with a specific vehicle, vehicle ID data is either input in block 14 along with the route ID, or the vehicle ID is collected with the inspection data in block 16. If desired, driver ID data can be similarly provided. In some embodiments, but not all embodiments, additional data (beyond inspection data and route ID data) can be collected to be combined with the inspection data, vehicle ID data, and route ID data. Such additional data can comprise a wide variety of different data types, such as operational parameters collected during operation of the vehicle over the specific predefined route (data such as brake temperature data, engine temperature data, coolant temperature data, tire pressure data, and geographical position data, although it should be recognized that such data types are intended to be exemplary, rather than limiting on the scope of this approach).

In a block 18, an inspection record including the route ID data and the inspection data (and any other collected data) is conveyed to a remote computing device via a data link. It should be recognized that, depending on the specific configuration of the vehicle, the inspection record can be conveyed after a trip over a specific predefined route has been completed, or in real-time while the route is being traveled by the vehicle (the real-time embodiment requires a vehicle to be equipped with a wireless communications data link).

In a block 20, the inspection record is analyzed to identify a specific predefined route over which the vehicle has been operated (i.e., the inspection record is parsed to identify the route identification data, which are then used to identify a particular one of the plurality of predefined routes over which the vehicle traveled).

Such a method will enable operators of a fleet of vehicles to be able to analyze electronic inspection data (noting that commercial vehicle operators are required to keep some type of inspection data, either electronic records or paper copies of inspection reports such as that shown in FIG. 4) to determine over which specific predefined route a vehicle was operated during a time period corresponding to a vehicle inspection. Since many commercial vehicle operators already keep electronic inspection data, adding the route ID to such inspection data will enable the electronic inspection data to not only provide evidence of inspections that were performed, but also provide a data record that the fleet operator can analyze to determine what route a vehicle serviced at a particular time associated with a vehicle inspection (noting that the inspection data is time indexed, to enable the inspection data to show compliance with daily inspection requirements). While specific vehicles are often assigned to specific routes, occasionally, maintenance issues or other events necessitate changing the vehicles assigned to specific routes. The method disclosed herein provides an alternative to the often tedious and time-consuming prior art techniques implemented by fleet operators to keep track of which route a particular vehicle was assigned to at any given time.

Figure 2:
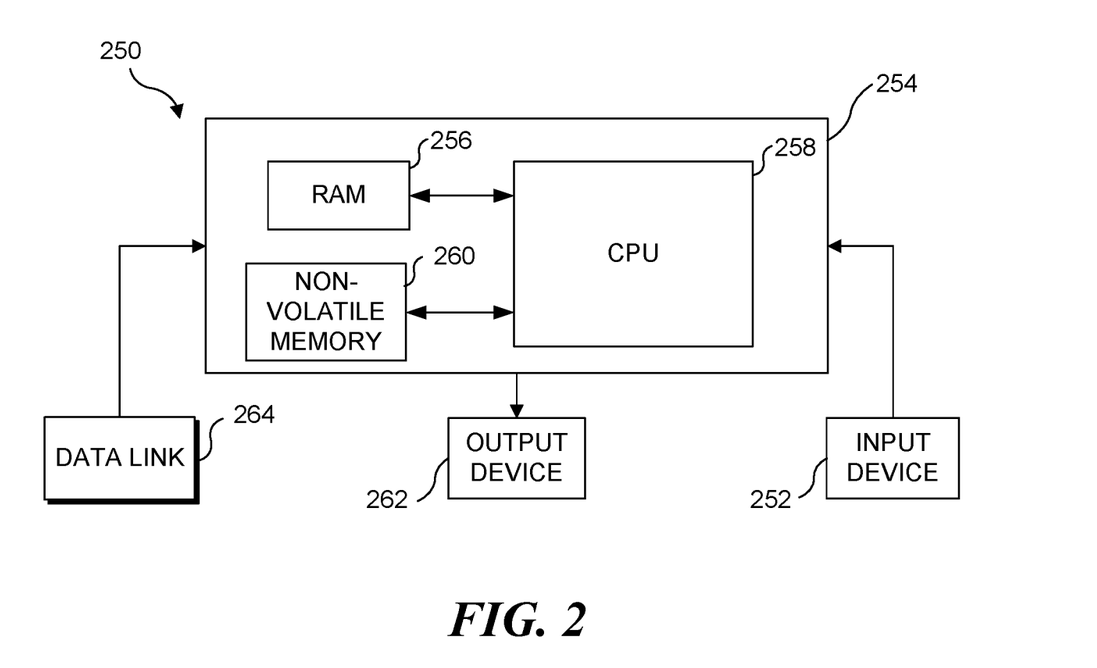
FIG. 2 is a functional block diagram of an exemplary computing device that can be employed to implement some of the method steps disclosed herein.

In general, analysis of the inspection record to determine the predefined route will be carried out by a remote computing device. In general, the remote computing device in at least one embodiment is a computing system controlled or accessed by the fleet operator. The remote computing device can be operating in a networked environment, and in some cases, may be operated by a third party under contract with the fleet operator to perform such services. FIG. 2 schematically illustrates an exemplary computing system 250 suitable for use in implementing the method of FIG. 1 (i.e., for executing step 20 of this method). Exemplary computing system 250 includes a processing unit 254 that is functionally coupled to an input device 252 and to an output device 262, e.g., a display (which can be used to output a result to a user, although such a result can also be stored). Processing unit 254 comprises, for example, a central processing unit (CPU) 258 that executes machine instructions for carrying out an analysis of the electronic inspection record to identify at least one of the following parameters: a specific vehicle, a specific time, a specific driver, a specific fault identified in the inspection record, and a specific route identified in the inspection record. In at least one exemplary embodiment, the machine instructions implement functions generally consistent with those described above with respect to step 20 of FIG. 1. CPUs suitable for this purpose are available, for example, from Intel Corporation, AMD Corporation, Motorola Corporation, and other sources, as will be well known to those of ordinary skill in this art.

Also included in processing unit 254 are a random access memory (RAM) 256 and non-volatile memory 260, which can include read only memory (ROM) and may include some form of memory storage, such as a hard drive, optical disk (and drive), etc. These memory devices are bi-directionally coupled to CPU 258. Such storage devices are well known in the art. Machine instructions and data are temporarily loaded into RAM 256 from non-volatile memory 260. Also stored in the memory are an operating system software and ancillary software. While not separately shown, it will be understood that a generally conventional power supply will be included to provide electrical power at a voltage and current level appropriate to energize computing system 250.

Input device 252 can be any device or mechanism that facilitates user input into the operating environment, including, but not limited to, one or more of a mouse or other pointing device, a keyboard, a microphone, a modem, or other input device. In general, the input device will be used to initially configure computing system 250, to achieve the desired processing (i.e., to parse an inspection record for a specific vehicle at a specific data to identify the route the vehicle serviced that date). Configuration of computing system 250 to achieve the desired processing includes the steps of loading appropriate processing software into non-volatile memory 260, and launching the processing application (e.g., loading the processing software into RAM 256 for execution by the CPU) so that the processing application is ready for use. Output device 262 generally includes any device that produces output information, but will most typically comprise a monitor or computer display designed for human visual perception of output. Use of a conventional computer keyboard for input device 252 and a computer display for output device 262 should be considered as exemplary, rather than as limiting on the scope of this system. Data link 264 is configured to enable data collected in connection with operation of a vehicle to be input into computing system 250 for subsequent analysis to identify a specific route over which the vehicle has been operated. Those of ordinary skill in the art will readily recognize that many types of data links can be implemented, including, but not limited to, universal serial bus (USB) ports, parallel ports, serial ports, inputs configured to couple with portable memory storage devices, FireWire™ ports, infrared data ports, wireless data ports such as Bluetooth™, network connections such as Ethernet ports, and Internet connections.

Figure 3A:
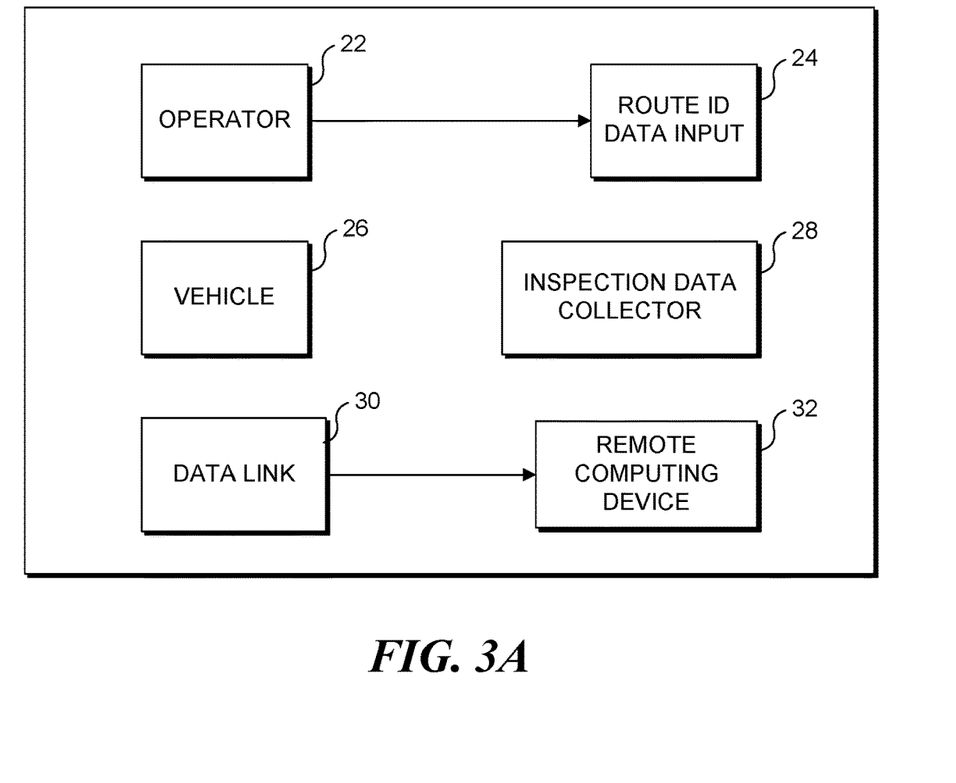
FIGS. 3A-3D are exemplary functional block diagrams showing how a plurality of functional elements can be configured differently to implement the method steps of FIG. 1.

FIGS. 3A-3D are functional block diagrams showing how a plurality of functional elements can be configured differently to implement the method steps of FIG. 1. FIG. 3A shows the basic functional elements, which include an operator 22, a route ID data input 24, a vehicle 26, an inspection data collector 28 (i.e., an element configured to collect inspection data documenting that a vehicle inspection was performed), a data link 30, and remote computing device 32. Those of ordinary skill in the art should readily recognize that these functional elements can be combined in a plurality of different configurations to implement the method steps of FIG. 1.

Figure 3B:
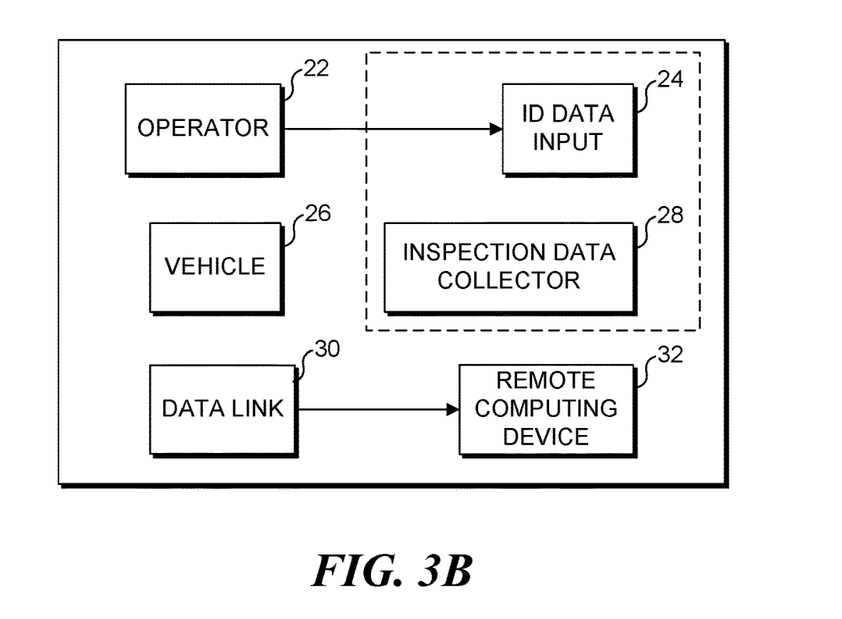

FIG. 3B schematically illustrates a first such configuration in which route identification data input 24 and inspection data collector 28 are implemented in a portable electronic data collection device used by the operator to both input the route ID data into the portable electronic data collection device, and to collect and store the inspection data. As noted above, the use of a portable electronic data collection device to collect both inspection data and ancillary data related to the operation of the vehicle is described in commonly assigned patent applications that have above specifically been incorporated herein by reference. The use of a portable electronic data collection device represents a particularly efficient exemplary embodiment.

In conjunction with collecting the inspection data, the operator will import the route ID data into the handheld electronic data collection device. It should be recognized that the route ID data can be entered before the inspection data are collected, the route ID data can be entered contemporaneously with the collection of the inspection data, or the route ID data can be entered after the inspection data have been collected. Generally, the route ID data are entered in connection with the operation of the vehicle over one of the plurality of predefined routes. Whenever the vehicle is subsequently operated over a different one of the plurality of predefined routes, the inspection record (comprising the route ID data and the inspection data) corresponding to the earlier used route of the plurality of predefined routes must be kept separate from the inspection record corresponding to a different one of the plurality of predefined routes. Generally, this is accomplished by date, as often the vehicle will service only a single predefined route on a given day. If a vehicle will service more than one route, then an additional inspection can be performed to generate an inspection record including inspection data and route ID data for that additional route. Alternatively, if a vehicle is servicing more than one route per vehicle inspection (noting such inspections generally are performed daily), then the operator can input new route ID data when the vehicle finishes one route and starts another. A time stamp included with the new route ID will enable the fleet operator to determine what route the vehicle was servicing at a given time and date, by reviewing the inspection records.

In general, route ID data input 24 comprises a keyboard or function keys incorporated into a portable electronic data collection device, and the route ID data are input as an alphanumeric sequence or numerical sequence. It should be recognized however, that other data input structures (i.e., structures other than keyboards) can instead be implemented, such that the concepts presented herein are not limited to any specific ID data input device. The operator can also use the handheld electronic data collection device to scan a token that uniquely corresponds to a specific one of the plurality of the predefined routes. For example, the operator can be provided with a plurality of tokens, each one of which uniquely corresponds to one of the plurality of predefined routes, such that the user selects the appropriate token, and uses the handheld electronic data collection device to scan the appropriate token. Many different tokens/sensor combinations can be implemented. Barcodes and optical scanners represent one combination, while radio frequency ID (RFID) tags and RFID readers represent another such combination. The advantage of a token/sensor combination is that the handheld electronic data collection device is not required to incorporate a keypad for entry of the route ID data. As a further alternative, the route ID data can be entered verbally, using voice recognition software in the handheld electronic collection device to recognize the verbal input. In embodiments where the route ID data is entered into a portable electronic data collection device, preferably the portable electronic data collection device is also employed to collect the inspection data (i.e., inspection data collector 28 is part of a portable electronic data collection device). The inspection data can include inspection data and/or data collected by sensors incorporated into the vehicle (configured to collect data such as engine temperature data, oil temperature data, brake temperature data, tire pressure data, tire temperature data, and geographical position data; recognizing that such data types are intended to be exemplary rather than limiting). Preferably, inspection data collector 28 comprises a sensor responsive to a token on the vehicle. As disclosed in detail in commonly assigned U.S. patent applications that have above been incorporated herein by reference, the token can simply indicate that an operator was proximate the token (i.e., the other data simply confirm that the operator was proximate the token), or the token can be configured to provide ancillary data collected by a sensor that is logically coupled to the token. Note that in this embodiment, the route ID data are stored in a memory in the portable device.

Figure 3C:
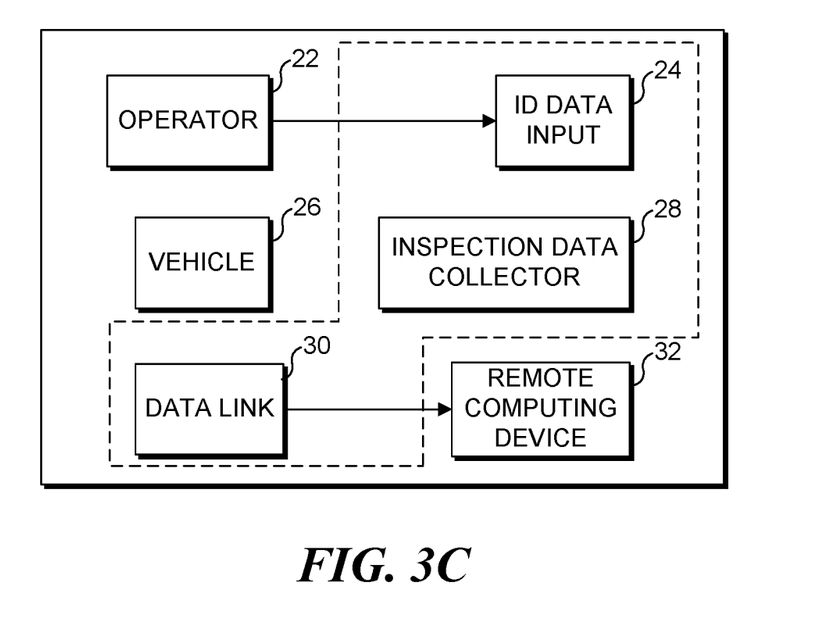

FIG. 3C corresponds to an alternative configuration for the functional elements shown in FIG. 3A. In this alternative configuration, data link 30 has been incorporated into the portable electronic data collection device (which also comprises ID data input 24 and inspection data collector 28). Those of ordinary skill in the art will recognize that such a data link can be implemented in a variety of different fashions, including, but not limited to, serial data ports, parallel data ports, USB data ports, infrared communication ports, Firewire ports, and/or radio frequency transmitter/receivers. In this embodiment, the route ID data are stored in a memory in the portable device.

Figure 3D:
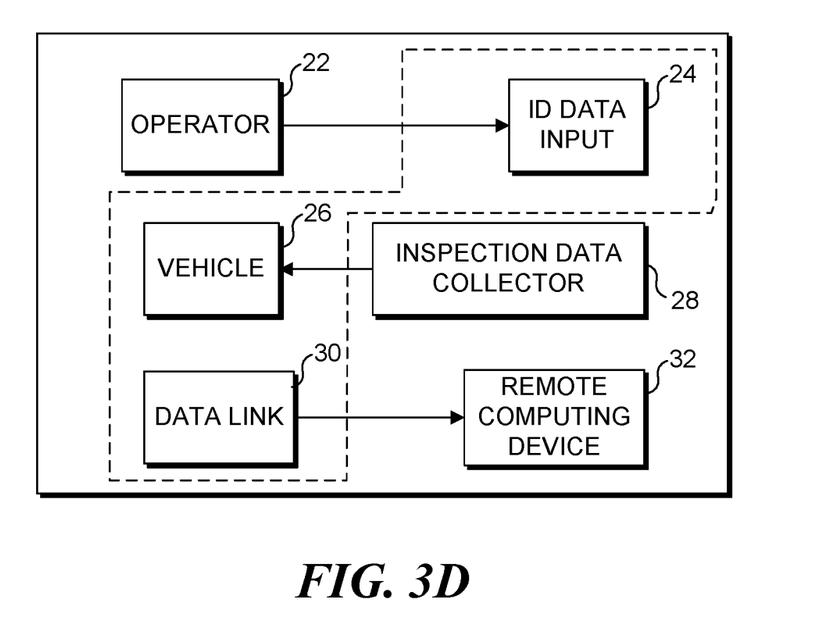

FIG. 3D corresponds to yet another alternative configuration for the functional elements shown in FIG. 3A. In such an alternative configuration, the route ID data input and the data link can be incorporated into the vehicle. An exemplary implementation of such an alternative configuration is a vehicle equipped with a wireless transmitter (as the data link, although as discussed above in detail, it should be recognized that other data links can be alternatively employed). Often such a transmitter may be part of a global positioning satellite (GPS) unit. Such a GPS unit can include a keypad, a touchpad, (or one of the alternative input devices discussed above in detail) enabling the operator to input the route ID data. During operation of the vehicle, the GPS unit will collect geographical positional data. Note that in this embodiment, the route ID data are stored in a memory in the vehicle, and the portable device will need to be logically coupled to the vehicle such that the route ID data can be combined with the inspection data before being conveyed to the remote computing device as an inspection record. The inspection record will include the route ID data, the inspection data, and in at least some embodiments, geographical position data.

With respect to FIGS. 5A-5D, described in detail below, it should be recognized that additional details relating to such Figures can be found in commonly assigned U.S. Pat. No. 6,671,646, entitled SYSTEM AND PROCESS TO ENSURE PERFORMANCE OF MANDATED SAFETY AND MAINTENANCE INSPECTIONS, the disclosure and drawings of which have been specifically incorporated herein by reference.

Figure 5A:
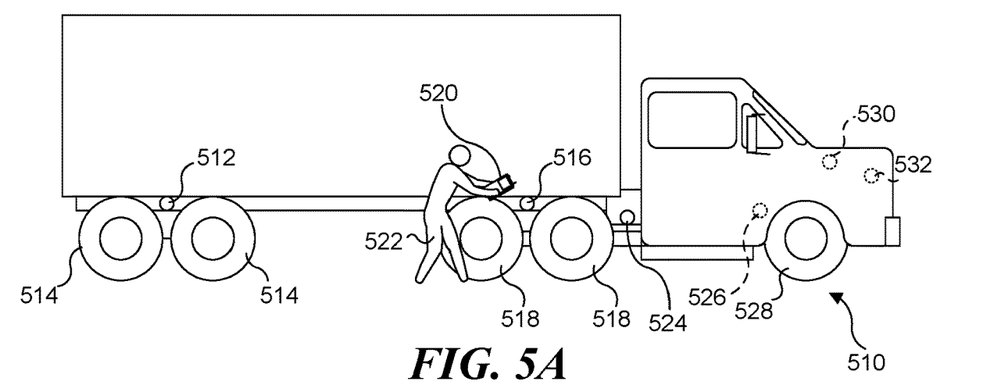
FIG. 5A is a schematic diagram of a tractor and trailer equipped with tokens at each component to be inspected, illustrating a person using a portable electronic data collection device to collect other data to be incorporated into an inspection record along with route ID data, generally in accord with the method steps of FIG. 1.

FIG. 5A is a schematic diagram of a tractor and trailer equipped with tokens at each component to be inspected, illustrating a person using a portable electronic data collection device to collect other data to be incorporated into an inspection record along with route ID data, generally in accord with the method steps of FIG. 1. FIG. 5A illustrates a tractor-trailer 510 with which a portable electronic data collection device is usable to carry out a safety inspection. Tractor-trailer 510 is provided with a plurality of tokens affixed adjacent to each checkpoint or component that is to be inspected. While only a few of the tokens are illustrated in FIG. 1, it should be recognized that most inspections will include additional tokens enabling the operator to be in compliance with the DOT regulations regarding pre- and post-inspections of such vehicles (noting that FIG. 4 is exemplary of a paper based checklist for such a vehicle inspection). A token can be affixed adjacent to the components and systems requiring inspection, although several components might be associated with the same token. For example, in the engine compartment, one token might be used for providing inspection of both the radiator and the belts. As a driver moves about the tractor and trailer, evidence that the driver or the person doing the inspection moved sufficiently close to the components being inspected so that the inspection could actually take place is recorded in a portable device 520 (first exemplary embodiment). Further details of portable device 520 and of other related embodiments are described below.

For the few tokens illustrated in FIG. 5A, the relevance of the disposition of the token adjacent to a corresponding component of the tractor-trailer 510 should be evident. For example, token 512 is disposed adjacent to tandem dual rear tires 514 on the trailer. Since all the tires of the tandem dual rear wheels on the left rear of the trailer are readily visible from a position adjacent to token 512, a single token is sufficient to determine that the driver was sufficiently close so that all four tires at the left rear of the trailer could be readily inspected. Similarly, tandem dual wheels 518 on the left rear of the tractor are readily inspected when an observer 522 is positioned as shown in FIG. 5A. In this position, the observer moves portable device 520 within a maximum predefined range of token 516, which is exposed above tandem dual rear wheels 518. Portable device 520 detects and responds to token 516, recording data indicating that the driver was in a position to inspect tandem dual rear wheels 518 on the tractor. It is contemplated that the operator may initiate the recognition of a token by activating a switch, or the portable device can instead simply automatically respond when a token is sufficiently close to the portable device.

Other tokens 524, 526, 530, and 532 are illustrated adjacent other components of the tractor that are part of the safety inspection. For example, token 526 is affixed adjacent to a tire 528, on the right front of the tractor, while tokens 530 and 532 are accessible if the front hood of the tractor is opened and are disposed adjacent the hydraulic brake master cylinder and the engine belts/radiator, respectively (not shown separately). For each token, there is a predetermined maximum distance that portable device 520 can be held from the token that will enable the portable device to detect the token, and thus, the component that is associated with it in order to produce a record as evidence that the person holding the portable device was in a position to inspect the component. Depending upon the component to be inspected and the type of token, different predetermined maximum distances may be assigned to the various components. The different predetermined maximum distances might be implemented by partially shielding a token to vary the distance at which the portable device can detect the token.

Figures 5B, 5C:
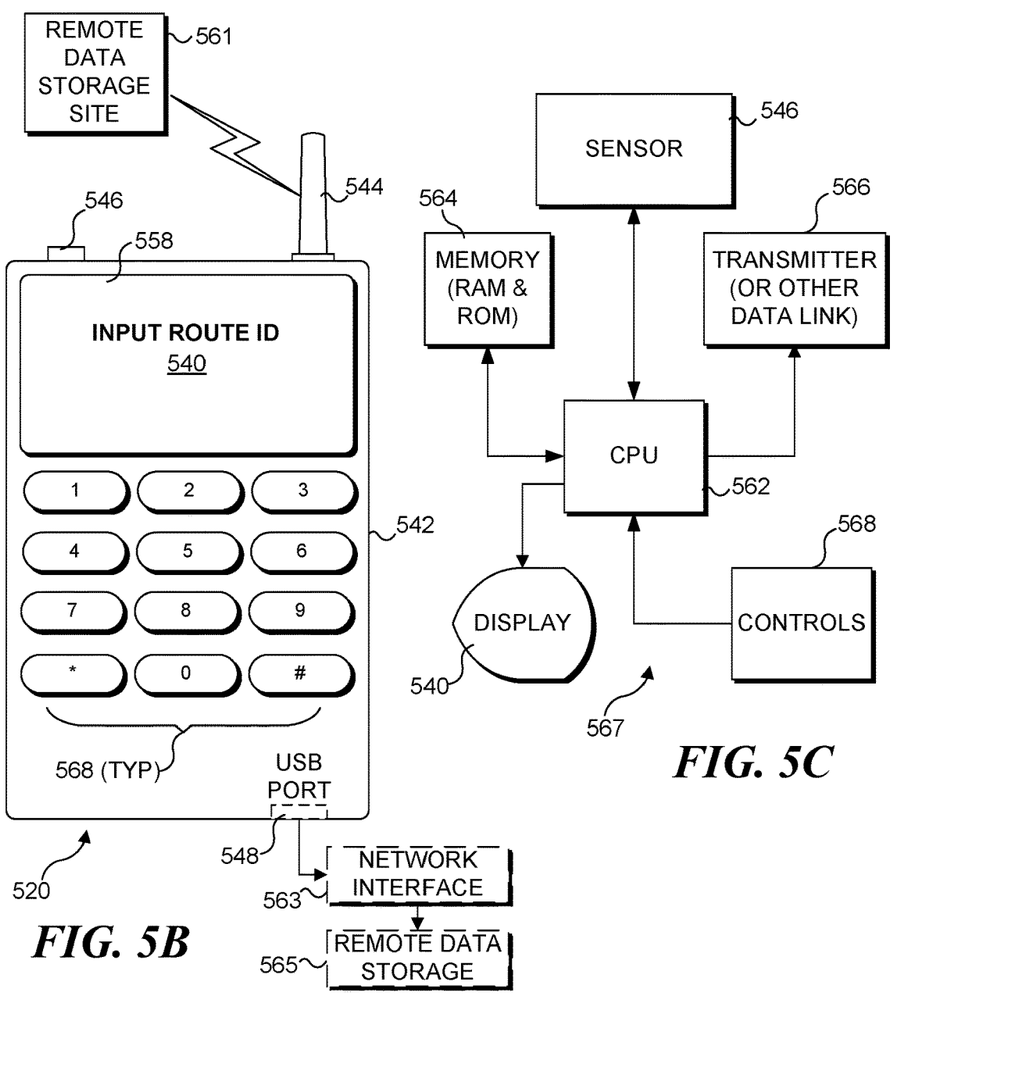
FIG. 5B is a top plan view of a portable device for use in making a safety inspection of a vehicle, showing a message that prompts the operator to input route ID data into the portable electronic data collection device, such that the route identification data are combined with inspection data to achieve an inspection record corresponding to a specific vehicle for a specific period of time, generally in accord with the method steps of FIG. 1.
FIG. 5C is a schematic block diagram of the functional components included in the portable device of FIG. 5B.

FIG. 5B is a top plan view of a portable device for use in making a safety inspection of a vehicle, showing a message that prompts the operator to input route ID data into the portable electronic data collection device, such that the route ID data are combined with inspection data to achieve an inspection record corresponding to a specific vehicle for a specific period of time, generally in accord with the method steps of FIG. 1. While FIG. 5B indicates that an exemplary portable electronic data collection device includes a keyboard-based route ID data input, it should be recognized that the other data input structures or devices discussed in detail above can alternatively be employed. As part of the inspection (or before the inspection, or after the inspection, but sometime in conjunction with the operation of the vehicle over one of the plurality of predefined routes), operator 522 is prompted to input the route ID data by a message 558 appearing on a display 540 of portable device 520, for example, using a keypad 568, as shown in FIG. 5B. As noted above, a specific token associated with a specific route can be read by the portable device to input the route ID data. Vehicle ID data and driver ID data can be similarly input into the portable device. Display 540 can also be used to prompt the operator to move to a different inspection location. For example, if operator 522 has just completed the inspection of tandem dual tires 514 on the left rear of the truck, display 540 can provide a prompt indicating that the operator should "verify tire condition—left rear of tractor." A sensor 546 on portable device 520 responds to token 516 when the portable device is held less than the predetermined maximum distance from token 516 by producing a signal indicating that the portable device was within the required range of tandem dual tires 518 to enable the operator to inspect the tires.

Display 540 is disposed on a front surface of a housing 542 of portable device 520. Sensor 546 is disposed on the top edge of housing 542, while an optional USB port 548 is disposed on the bottom edge of housing 542, opposite sensor 546. An antenna 544 is also disposed on the top edge of the housing for transmitting radio frequency (RF) transmissions to a remote data storage site 561 that is used for long-term storage of data resulting from safety inspections, which corresponds to the functional block diagram configuration of FIG. 3C. The data produced by a safety inspection indicate each of the components of the vehicle (or other system or apparatus being inspected) that were visited by the operator, so that the portable device was positioned within the predetermined maximum distance from the token associated with the component, and further indicates the status of the component entered by the operator (or automatically recorded).

FIG. 5C is a schematic block diagram of the functional components included in the portable device of FIG. 5B. Thus, FIG. 5C illustrates functional components 567 that are included in portable device 520, either on or inside housing 542. A central processing unit (CPU) 562 comprises the controller for portable device 520 and is coupled bi-directionally to a memory 564 that includes both RAM and ROM. Memory 564 is used for storing data in RAM and machine instructions in ROM that control the functionality of CPU 562 when the machine instructions are executed by it. CPU 562 is also coupled to receive operator input from controls 568. Typically, after operator 522 inputs the route ID data and has visited each of the checkpoints required for the safety inspection (thereby collecting the other data), the operator can transmit the inspection record (comprising the route ID data and the other data/inspection data) that have been collected during the inspection to remote data storage site 561 through an RF transmission via antenna 544. The data provide evidence that the operator has visited the components and indicated the state and condition of the components that were visited and inspected and also provide an indication upon which one of the plurality of predefined routes the vehicle has been operated to be specifically identified, generally as discussed above with respect to the method of FIG. 1. Alternatively, optional USB port 548 on portable device 520 can be coupled to a network interface 563 on an external cradle or docking station (an example of which is described below in connection with FIG. 5D), which is in communication with remote data storage 565, as shown in FIG. 5B. In FIG. 5C, CPU 562 is shown communicating data to transmitter 566 (or through another data link) using a wired and/or wireless data communication link. The data collected and stored (in memory 564 of portable device 520) during the safety inspection can thus be safely transferred to the remote data storage site and retained for as long as the data might be needed.

Figure 5D:
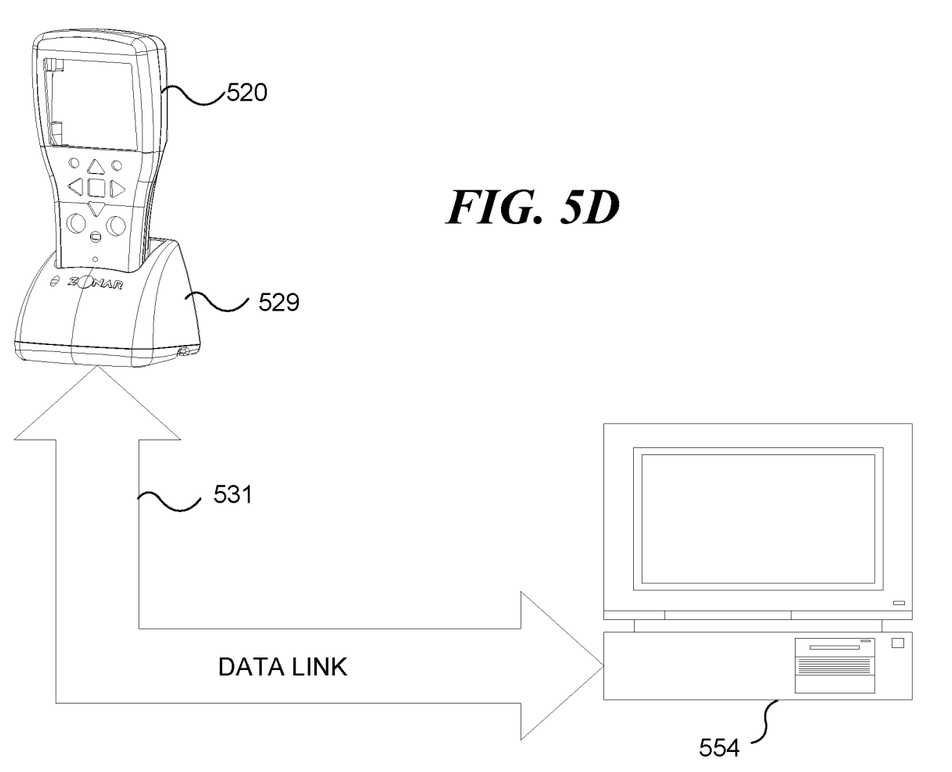
FIG. 5D is a schematic diagram of an exemplary system for transferring an inspection record from a portable electronic data collection device over the Internet, between the portable electronic data collection device that is disposed in a docking station and storage on a remote computing device.

In some cases, it may be preferable to transmit the data to the remote site immediately after making a safety inspection to ensure that the data retained in memory 564 are not lost should an accident occur that destroys portable device 520. An accident destroying the evidence that the safety inspection was implemented could have an adverse effect during any litigation related to the accident, which might allegedly have been caused by one of the components that was purported to have been inspected. However, since the risk of such an accident is relatively remote, it is contemplated that an operator may collect the data from a number of safety inspections in memory 564 and then subsequently upload the data to remote data storage 565 by coupling the portable device to the external cradle or docking station that includes a USB port terminal and network interface that facilitates connecting via the Internet or other network, to a remote storage, generally as indicated in FIG. 5D. The cradle or docking station might be maintained by a carrier at a freight terminal, which is at least periodically visited by the truck that was inspected. Alternatively, the external cradle or docking station might be disposed at a different site and/or connect to the remote data storage site through other types of communication links. One example of such a communication system is the OMNITRACS™ satellite mobile communication system sold by Qualcomm Corporation that enables drivers on the road and carriers to remain in communication with each other and enables the carrier to monitor the location of a tractor-trailer during a trip. By linking portable device 520 through USB port 548 to such a data communication system, the data stored within memory 564 can readily be transmitted to a remote site maintained by the carrier for long-term storage, even while a trip by the tractor-trailer is in progress.

FIG. 5D is a schematic diagram of the system for transferring an inspection record from a portable electronic data collection device over the Internet, between the portable electronic data collection device in the docking station and storage on a remote computing device. Docking station 529 includes an interface circuit that couples the data port on portable device 520 to a personal computer 554 through a data link 531. In this exemplary embodiment, the interface circuit converts the data format of portable device 520 to a format compatible with data link 531, which is connected to an input port of remote computer 554. It is contemplated that docking station 529 might be disposed in a terminal or other location to which the portable device is returned between inspections or at other times, to transfer data from the memory within the portable device to remote storage on remote computer 554.

The tokens that are affixed at various points on the tractor-trailer (or adjacent components of other types of systems or apparatus unrelated to a vehicle) can be of several different types, depending upon the type of sensor 546 that is included on portable device 520. In at least one exemplary embodiment, the token that is employed is an RF ID (RFID) tag that is attached with a fastener or an appropriate adhesive to a point on a frame or other support (not shown) adjacent to the component associated with the token. One type of RFID tag that is suitable for this purpose is the WORLD-TAG™ token that is sold by Sokymat Corporation. This tag is excited by an RF transmission from portable device 520 via antenna 544. In response to the excitation energy received, the RFID tag modifies the RF energy that is received from antenna 544 in a manner that specifically identifies the component associated with the RFID tag, and the modified signal is detected by sensor 546. An alternative type of token that can also be used is an IBUTTON™ computer chip, which is armored in stainless steel housing and is readily affixed to a frame or other portion of the vehicle (or other type of apparatus or system), adjacent to the component associated with the IBUTTON™ chip. The IBUTTON™ chip is programmed with JAVA™ instructions to provide a recognition signal when interrogated by a signal received from a nearby transmitter, such as from antenna 544 on portable device 520. The signal produced by the IBUTTON™ chip is received by sensor 546, which determines the type of component associated with the token. This type of token is less desirable since it is more expensive, although the program instructions that it executes can provide greater functionality.

Yet another type of token that might be used is an optical bar code in which a sequence of lines of varying width or of other distinctive characteristic encodes light reflected from the bar code tag. The encoded reflected light is received by sensor 546, which is then read by an optical detector. Bar code technology is well understood in the art and readily adapted for identifying a particular type of component and location of the component on a vehicle or other system or apparatus. One drawback to the use of a bar code tag as a token is that in an exposed location, the bar code can be covered with dirt or grime that must be cleaned before the sequence of bar code lines can be properly read. If the bar code is applied to a plasticized adhesive strip, it can readily be mounted to any surface and then easily cleaned with a rag or other appropriate material.

Still another type of token usable in the present approach is a magnetic strip in which a varying magnetic flux encodes data identifying the particular component associated with the token. Such magnetic strips are often used in access cards that are read by readers mounted adjacent to doors or in an elevator that provides access to a building. However, in the present approach, the magnetic flux reader comprises sensor 546 on portable device 520. The data encoded on such a token are readily read as the portable device is brought into proximity with the varying magnetic flux encoded strip comprising the token. As a further alternative, an active token can be employed that conforms to the BLUETOOTH™ specification for short distance data transfer between computing devices using an RF signal. However, it is likely that the range of the signal transmitted by the token would need to be modified so that it is substantially less than that normally provided by a device conforming to the BLUETOOTH™ specification. It is important that the portable device be able to detect that it is proximate to the component within a predetermined maximum range selected to ensure that the operator is positioned to actually carry out an inspection of the component.

Alternative Portable Devices

While it is likely that an initial preferred embodiment will employ portable device 520, it is also contemplated that an accessory might be provided for a personal digital assistant (PDA), such as the PALM™ PDA, which would enable the PDA to be used for the same functions as portable device 520. The accessory to the PDA will include a sensor to detect when the PDA is within the predetermined maximum range from the token associated with the component currently being inspected. The conventional controls on the PDA can be used to make and enter a selection. Furthermore, instead of using a cursor control, it is also contemplated that a touch screen display might instead be used for making selections of menu items and other options presented to the operator. In addition, the PDA would need to be programmed to carry out the functions implemented by portable device 520, as described above. Smart phones including a token reader (or coupled to an accessory token reader) can also be similarly employed.

Exemplary Analysis of Inspection Records by Remote Computing Device

As discussed above, the concepts disclosed herein encompass including route ID data in an inspection record also including inspection data, such that a fleet operator can use the electronic inspection record (which is archived to provide evidence that required inspections were completed) to determine which route a particular vehicle serviced during a time period corresponding to the inspection.

In one exemplary embodiment, where the inspection is a pre-trip inspection, the route ID data portion of the inspection record (which includes inspection data and route ID data) indicates what route the vehicle will service in a time period between the current pre-trip inspection and a subsequent pre-trip inspection. In another exemplary embodiment, where the inspection is a post-trip inspection, the route ID data portion of the inspection record (which includes inspection data and route ID data) indicates what route the vehicle serviced in a time period between the current post-trip inspection and the previous post-trip inspection. The artisan of ordinary skill will appreciate that the inspection record can include a temporal data element that is used to define a time period after (or before) the inspection data that corresponds to specific route ID data. As a default, in at least one exemplary embodiment, the inspection data and route ID data correspond to a specific day (as many fleet operators perform one vehicle inspection per day, and assign a particular vehicle to a single route per day).

An exemplary set of inspection data will include inspection data, route ID data, driver ID data (a useful data component, but not one that is strictly required), vehicle ID data, and time data (i.e., data defining the date and time of the inspection). In an exemplary embodiment, the inspection data includes token data that provides evidence that the handheld device used to collect the inspection data was proximate specific tokens distributed about the vehicle at a specific time and date (providing evidence that an operator tasked to perform the inspection was physically proximate to the vehicle equipment requiring inspection). In another exemplary embodiment, the inspection data is an electronic checklist similar to the checklist of FIG. 4 (noting that such a checklist need not include each element of the checklist of FIG. 4, and that such a checklist does not provide evidence that the operator was physically proximate the vehicle components to be inspected).

To comply with inspection requirements, a fleet operator will generate inspection data for each day a specific vehicle is operated. Such fleet operators can use such exemplary inspection records in a number of ways. First, the inspection record can be used to show that the fleet operators complied with vehicle inspection requirements (regulatory defined requirements and/or fleet operator defined requirements). Fleet operators can also use the inspection record to determine which route a vehicle serviced on a specific date or time. The artisan of ordinary skill will recognize that many different search parameters can be used to extract desired data from the archived inspection records for the fleet. Such data searches are based on defining a specific parameter (such as driver ID, route ID, vehicle ID, and/or inspection date) and searching the archived data for particular inspection records that include a match.

One potentially useful search may indicate to a fleet operators that specific routes generate maintenance problems identified in vehicle inspections. Assume that post-trip inspections records are segregated from pre-trip inspection records (this can be done in a search string). A user searches the post-trip inspection records for all records where the inspection data indicates a problem. If one particular route is overrepresented in that search result, such a result suggests that conditions over that route can be leading to mechanical failures flagged in the post-trip inspection. This can lead the fleet operator to changing the route to reduce the maintenance problem, or changing the vehicles assigned to that route (for example, if the mechanical failure flagged in the inspection record are predominately brake problems, then vehicles with heavier duty braking systems can be preferentially assigned to that route, or the route can be slightly revised to avoid terrain (such as a particularly steep road surface) leading to the failures).

As used herein an the claims that follow, the phrase time period proximate the inspection of the vehicle should be understood to refer to that period, either before or after the vehicle inspection, when the vehicle will be used to service the route whose identity has been included in the inspection record. When a vehicle will be used to service multiple routes throughout a single day, the driver can perform a new inspection to be associated with the new route. For many fleet operators, the time period will be a calendar day. However, the concepts disclosed herein encompass different time periods. Fleet operators can define time periods (i.e., time periods before or after a vehicle inspection) to suit their individual needs. Further, users are free to define such time periods as only including time after an inspection (suitable for pre-trip inspections), or only including time before an inspection (suitable for post-trip inspections). In an exemplary but not limiting embodiment, the time period is defined by both a pre-trip vehicle inspection (which defines the beginning of the time period) and a post-trip vehicle inspection (which defines the end of the time period).

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention claimed is:

1. A method of inspecting a vehicle having a first optical code disposed proximate a first inspection location having a first set of one or more vehicle components and a second optical code disposed proximate a second inspection location having a second set of one or more vehicle components, including:
   (a) providing a mobile computing device including an optical detector, a display, a user input device, a cellular network transceiver and a non-transitory memory media having a program adapted to recognize the first and second optical codes perceived by the optical detector and respond to these recognitions of the optical codes by displaying information on the display;
(b) using the optical detector to perceive the first optical code, and reading the information shown, as a consequence of the recognition of the first optical code, on the display, wherein the information shown in consequence of the recognition of the first optical code is a query regarding the status of the first set of one or more vehicle components of the first inspection location;
(c) entering information regarding the status of the first set of one or more vehicle components into the user input device, in response to the information shown on the display;
(d) using the optical detector to perceive the second optical code, and reading the information shown, as a consequence of the recognition of the second optical code, on the display, wherein the information shown in consequence of the recognition of the second optical code is a query regarding the status of the second set of one or more vehicle components of the second inspection location; and
(e) entering information regarding the status of the second set of one or more vehicle components into the user input device, in response to the information shown on the display.

2. The method of claim 1, wherein the mobile computing device is a smart phone.

3. The method of claim 1, wherein the mobile computing device includes a touch screen, which serves as both the display and the user input device.

4. Non-transitory memory media, in a mobile computing device that includes an optical detector, a display, a user input device, and a cellular network transceiver, the non-transitory memory media having stored thereon computer-executable instructions that, when executed by a processor, are adapted to:
(a) recognize a first optical code perceived by the optical detector and respond by showing on the display a first information set regarding a first set of one or more vehicle components of a first vehicle inspection location;
(b) record information regarding the first set of one or more vehicle components entered into the user input device, after the showing of the first information set on the display;
(c) recognize a second optical code perceived by the optical detector and respond by showing on the display a second information set regarding a second set of one or more vehicle components of a second vehicle inspection location;
(d) record information regarding the second set of one or more vehicle components entered into the user input device, after the showing of the second information set on the display; and
(e) in response to an input at said user input device, use the cellular transceiver to send the information recorded, that was entered in the user input device, to a destination.

5. The non-transitory memory media of claim 4, wherein the mobile computing device is a smart phone.

6. The method of claim 1, further including using the user input device to indicate that the inspection is complete, thereby causing the mobile computing device to use the cellular transceiver to send the inspection results over the cell network.

7. The method of claim 1, wherein the first and second optical codes are bar codes.

8. A mobile computing device including an optical detector, a display, a user input device, a cellular network transceiver and a non-transitory memory media having a program adapted to:
(a) recognize a first optical code perceived by the optical detector and respond by showing on the display a first information set regarding a first set of one or more vehicle components of a first Vehicle inspection location;
(b) record information regarding the first set of one or more vehicle components entered into the user input device, after the showing of the first information set on the display;
(c) recognize a second optical code perceived by the optical detector and respond by showing on the display a second information set regarding a second set of one or more vehicle components;
(d) record information regarding the second set of the one or more vehicle components entered into the user input device, after the showing of the second information set on the display; and
(e) in response to an input at said user input device, use the cellular transceiver to send the information recorded, that was entered in the user input device, to a destination.

9. The mobile computing device of claim 8, wherein the mobile computing device is a smart phone.

10. The mobile computing device of claim 8, wherein the mobile computing device includes a touch screen, which serves as both the display and the user input device.

11. The non-transitory memory media of claim 4, wherein the mobile computing device includes a touch screen, which serves as both the display and the user input device.

12. The non-transitory memory media of claim 4, wherein the first and second optical codes are bar codes.

13. The mobile computing device of claim 8, wherein the first and second optical codes are bar codes.

* * * * *